United States Patent
Uramichi

(10) Patent No.: US 7,097,251 B2
(45) Date of Patent: *Aug. 29, 2006

(54) RECLINING DEVICE FOR A SEAT

(75) Inventor: Hideki Uramichi, Toyota (JP)

(73) Assignee: Toyota Boshoku Kabushiki Kaisha, Toyota (JP)

( * ) Notice: Subject to any disclaimer, the term of this patent is extended or adjusted under 35 U.S.C. 154(b) by 407 days.

This patent is subject to a terminal disclaimer.

(21) Appl. No.: 10/417,097

(22) Filed: Apr. 17, 2003

(65) Prior Publication Data

US 2003/0230923 A1    Dec. 18, 2003

Related U.S. Application Data

(63) Continuation-in-part of application No. 09/974,864, filed on Oct. 12, 2001, now Pat. No. 6,758,525.

(30) Foreign Application Priority Data

Oct. 13, 2000  (JP) .............................. 2000-313961
Aug. 5, 2002   (JP) .............................. 2002-227680

(51) Int. Cl.
     *B60N 2/02*     (2006.01)

(52) U.S. Cl. ...................... 297/366; 297/367; 297/368

(58) Field of Classification Search ................ 297/367, 297/366, 368, 216.13, 216.14
     See application file for complete search history.

(56) References Cited

U.S. PATENT DOCUMENTS

| | | |
|---|---|---|
| 5,161,856 A | 11/1992 | Nishino |
| 5,590,931 A * | 1/1997 | Fourrey et al. ............. 297/366 |
| 5,779,313 A | 7/1998 | Rohee |
| 5,816,656 A | 10/1998 | Hoshihara et al. |
| 6,007,153 A | 12/1999 | Benoit et al. |
| 6,019,430 A * | 2/2000 | Magyar et al. ............. 297/367 |
| 6,024,410 A * | 2/2000 | Yoshida ................... 297/301.1 |
| 6,039,400 A | 3/2000 | Yoshida et al. |
| 6,092,874 A | 7/2000 | Kojima et al. |
| 6,095,608 A | 8/2000 | Ganot et al. |

(Continued)

FOREIGN PATENT DOCUMENTS

FR    2747626    10/1997

(Continued)

*Primary Examiner*—Peter M. Cuomo
*Assistant Examiner*—Erika Garrett
(74) *Attorney, Agent, or Firm*—Oliff & Berridge, PLC

(57) ABSTRACT

It is possible to set a free zone and use a greater number of pawls in a reclining device having a plurality of pawls even if an angular range where a certain pawl is out of mesh with a ratchet and an angular range where pawls adjacent to that pawl are in mesh with the ratchet overlap with each other in a plan view, by bringing the other pawls out of mesh through an operation of bringing one specific pawl out of mesh. An unlock plate holds at least one pawl in retreat from the ratchet while a stationary disc holding the pawls and a movable disc having the ratchet form a relative rotational angle within a predetermined range. By holding the other pawls out of mesh through retreat of the pawl from the ratchet, an angular range for the operation of bringing one of the pawls Out of mesh with the ratchet by means of the unlock plate, and an angular range for the operation where the adjacent pawls are brought into mesh with the ratchet are so set as to overlap with each other in a plan view.

20 Claims, 19 Drawing Sheets

U.S. PATENT DOCUMENTS

| | | |
|---|---|---|
| 6,164,723 A | 12/2000 | Ganot |
| 6,312,053 B1 * | 11/2001 | Magyar ...................... 297/367 |
| 6,328,382 B1 * | 12/2001 | Yamashita .................. 297/367 |
| 6,439,663 B1 | 8/2002 | Ikegaya |
| 6,474,734 B1 | 11/2002 | Matsuda et al. |
| 6,474,740 B1 | 11/2002 | Kondo et al. |
| 6,511,129 B1 * | 1/2003 | Minor et al. ................. 297/367 |
| 6,543,850 B1 * | 4/2003 | Becker et al. ............... 297/367 |
| 6,883,869 B1 * | 4/2005 | Liu et al. ..................... 297/367 |

FOREIGN PATENT DOCUMENTS

| | | |
|---|---|---|
| FR | 2777234 | 10/1999 |
| JP | A 6-125821 | 5/1994 |
| JP | A 9-183327 | 7/1997 |
| JP | A 2001-17259 A | 1/2001 |
| JP | A-2003-000379 | 1/2003 |

* cited by examiner

F I G. 16
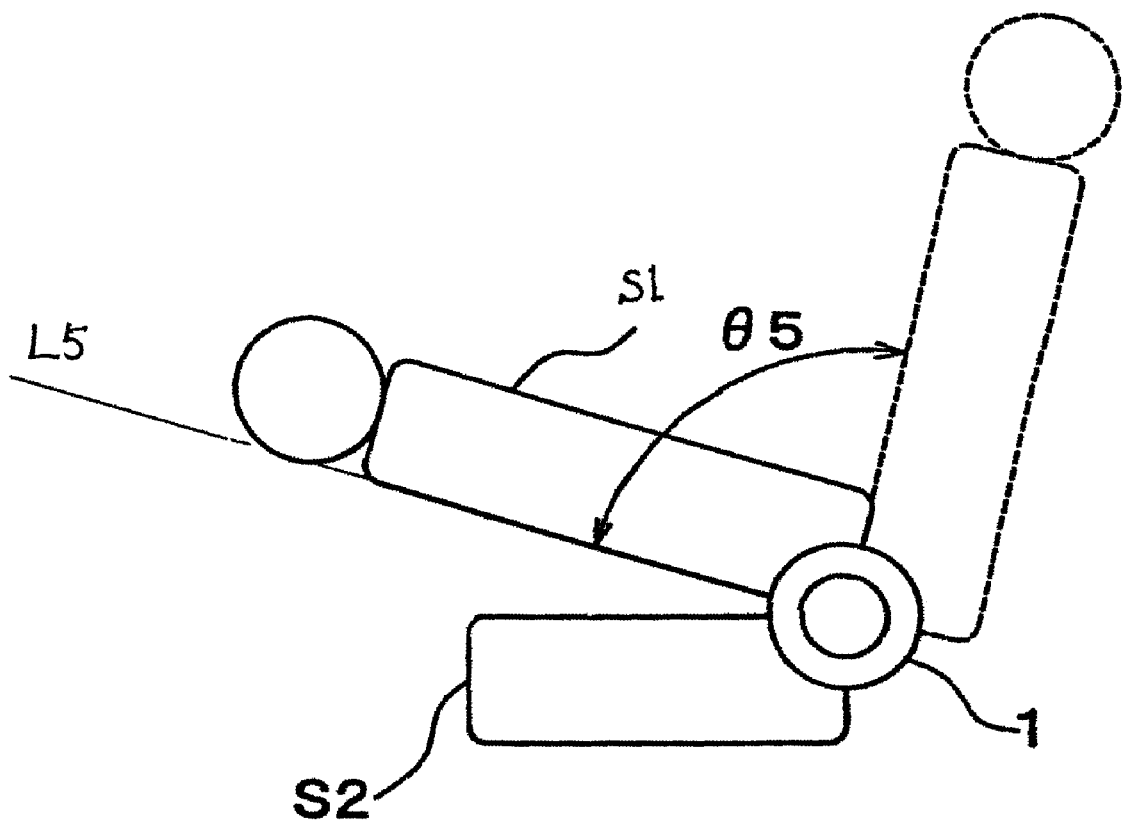

RECLINING DEVICE FOR A SEAT

INCORPORATION BY REFERENCE

This is a division (continuation-in-part) of application Ser. No. 09/974,864 filed on Oct. 12, 2001 and the disclosure of Japanese Patent Application No. 2002-227680 filed on Aug. 5, 2002 including the specification, drawings and abstract is incorporated herein by reference in its entirety.

BACKGROUND OF THE INVENTION

1. Field of Invention

The invention relates to a reclining device, and more particularly to the setting of a free zone of a seat back.

2. Description of Related Art

A reclining device of a certain type is constructed as follows. First of all, a pawl having outer teeth on the side of a leading end thereof is brought into mesh with inner teeth of a ratchet on the side of an inner periphery thereof, so that a seat back is locked with respect to a seat cushion. Then, the seat back is unlocked with respect to the seat cushion by bringing the pawl out of mesh with the ratchet, so that the seat back can be tilted.

A reclining device of this type makes it possible to enhance locking strength of the seat back with respect to the seat cushion by enhancing meshing strength between the pawl and the ratchet. Therefore, as proposed, e.g., by Japanese Patent Application Laid-Open No. 6-125821, there is a reclining device employing a plurality of pawls to enhance meshing strength between the pawls and a ratchet. The reclining device of this type necessitates a range where the pawls are out of mesh while the ratchet is within a predetermined angular range, i.e., a free zone. The reclining device proposed by the aforementioned publication adopts a means of forming a free zone by introducing an unlatching ring.

In the reclining device of this type, the meshing strength between the pawls and the ratchet can be enhanced in proportion to an increase in the number of pawls to be employed. However, if the number of pawls is increased, a convex portion for setting a free zone cannot be formed on the unlatching ring for bringing the pawls out of mesh. This is because the convex portion for setting a free zone of a certain one of the pawls is located at a position where the pawls adjacent thereto are to be brought into mesh. This problem becomes all the more serious as the number of pawls increases or as the angular range of the free zone widens.

SUMMARY OF THE INVENTION

It is an object of the invention to make it possible to set a free zone in a reclining device of the aforementioned type and thus install a greater number of pawls and enhance meshing strength between the pawls and a ratchet even if an angular range where a certain one of the pawls is to be brought out of mesh with the ratchet and an angular range where the pawls adjacent to the certain one of the pawls are to be brought into mesh with the ratchet overlap with each other in a plan view, i.e., even if the sum of the angles to be set to bring the pawls into mesh and the angles to be set to bring the pawls out of mesh exceeds 360°.

A reclining device according to one aspect of the invention comprises a plurality of pawls, a ratchet, a holder, a cam body and an unlock member. The pawls have first teeth. The ratchet has a second teeth engaging the first teeth. The holder rotates concentrically with respect to the ratchet and holds the pawls such that the pawls can move toward and away from the second teeth of the ratchet. The cam body prevents the holder and the ratchet from rotating relative to each other and moving the pawls toward the ratchet to bring the pawls into mesh with the ratchet, and allows the holder and the ratchet to rotate relative to each other and moving the pawls away from the ratchet to bring the pawls out of mesh with the ratchet.

The reclining device according to another aspect of the invention comprises an unlock member that holds at least one of the pawls while the holder and the ratchet form a relative rotational angle of a predetermined range and that brings the at least one of the pawls out of mesh with the ratchet. The sum of all angles to be set to bring the pawls into mesh or out of mesh exceeds 360°.

In the reclining device according to another aspect of the invention, the unlock member may have a hole for engagement with a protrusion portion formed on the at least one of the pawls. The unlock member may rotate together with the ratchet. The unlock member may engage the protrusion portion of the at least one of the pawls within a free zone angular range of the at least one of the pawls.

BRIEF DESCRIPTION OF THE DRAWINGS

The invention will be described with reference to the following drawings in which like reference numerals refer to like elements and wherein:

FIG. 16 is a side view of the reclining seat in the state shown in FIG. 15; and

DETAILED DESCRIPTION OF PREFERRED EMBODIMENTS

Figure 1:
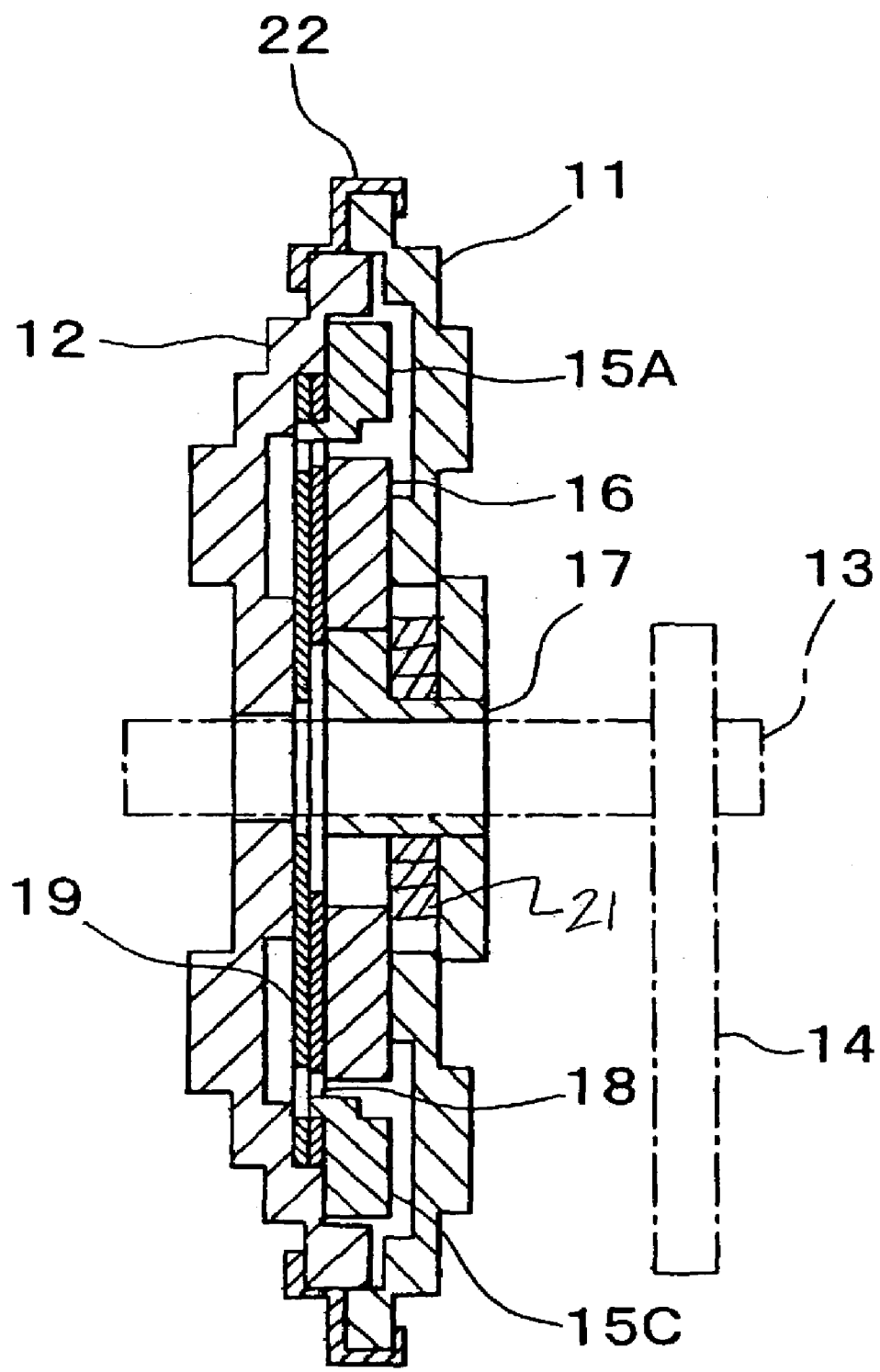
FIG. 1 is a longitudinal sectional view of a reclining device according to an embodiment of the invention.
Figure 2:
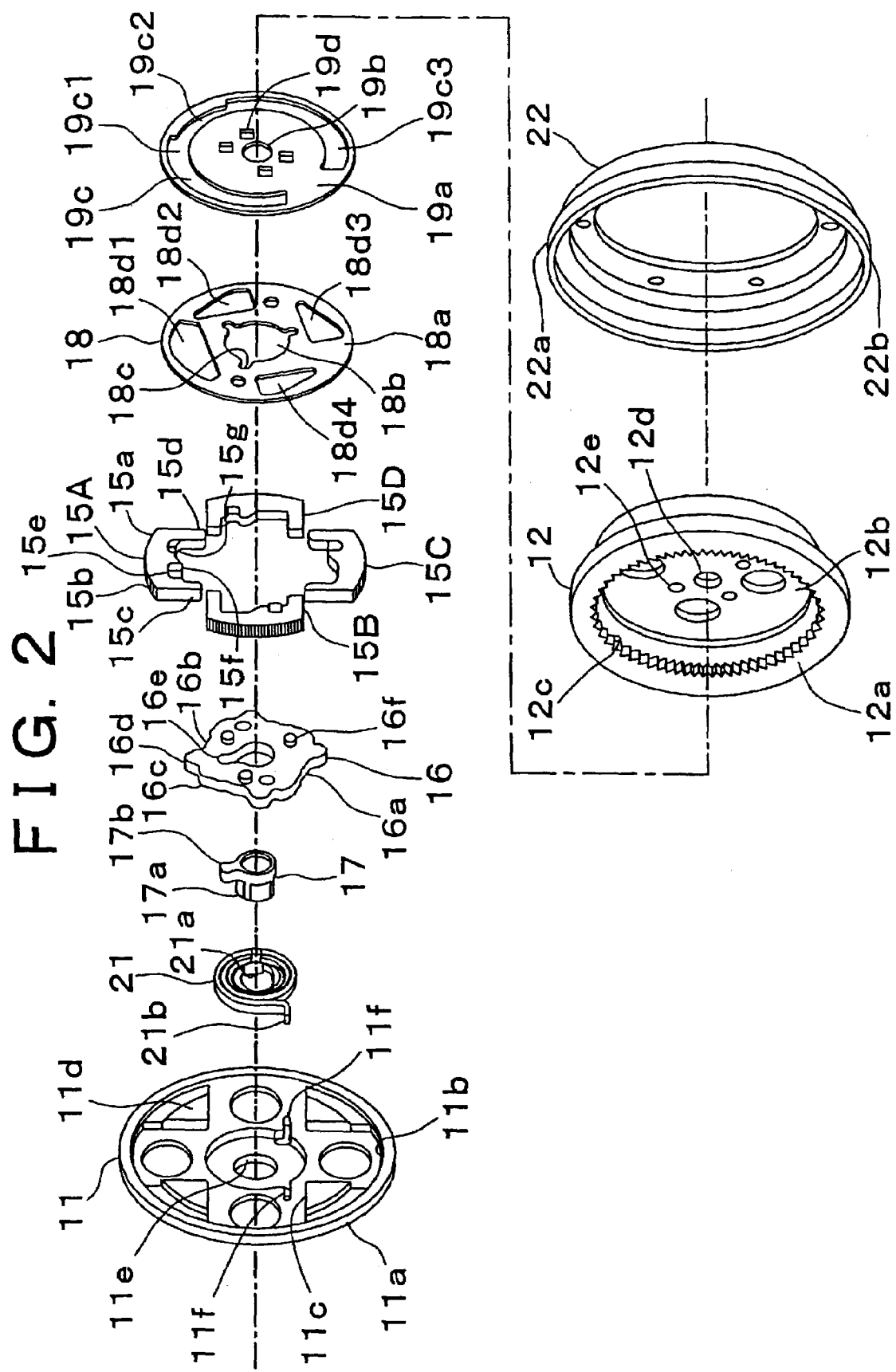
FIG. 2 is an exploded perspective view showing how components of the reclining device are arranged.
Figure 3:
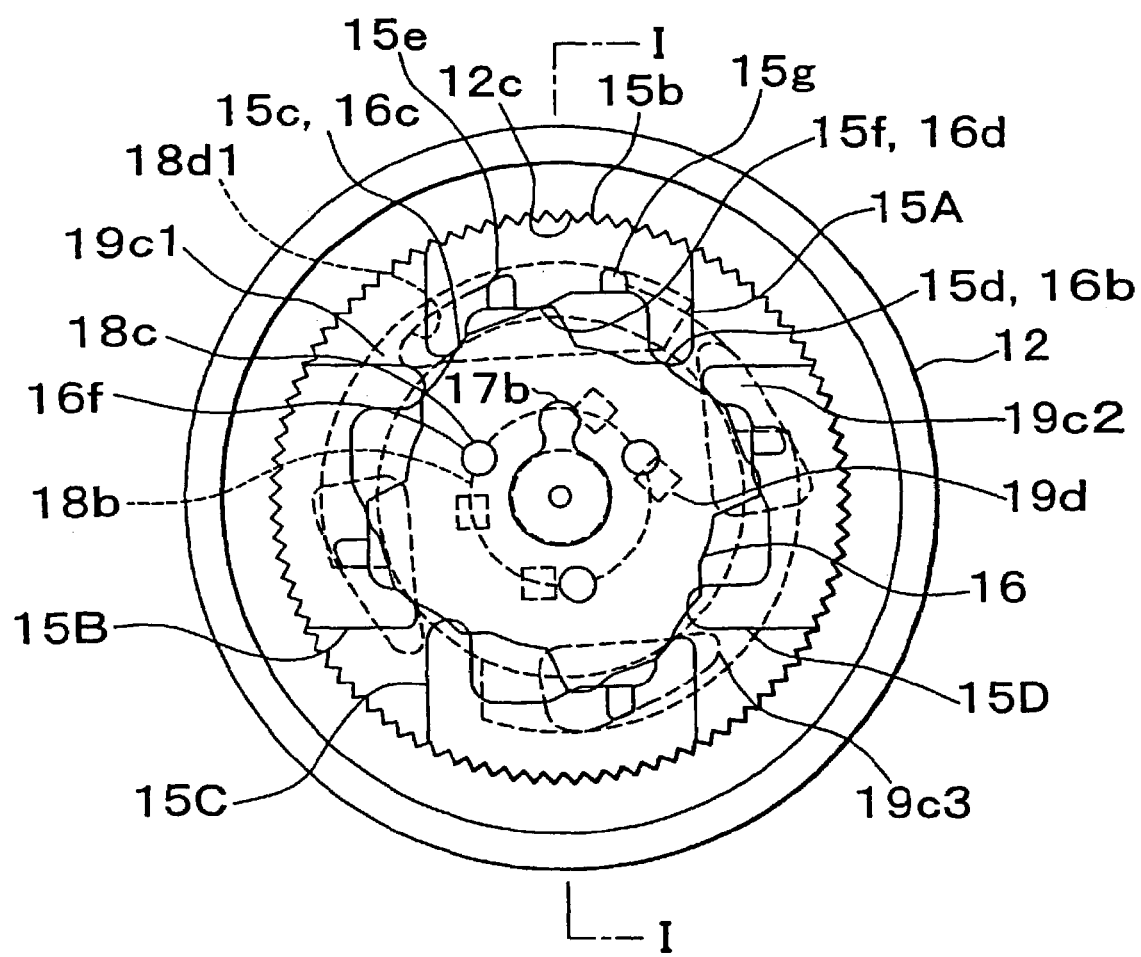
FIG. 3 is a front view of the reclining device with some of its components removed, with slide pawls in engagement with a ratchet.
Figure 4:
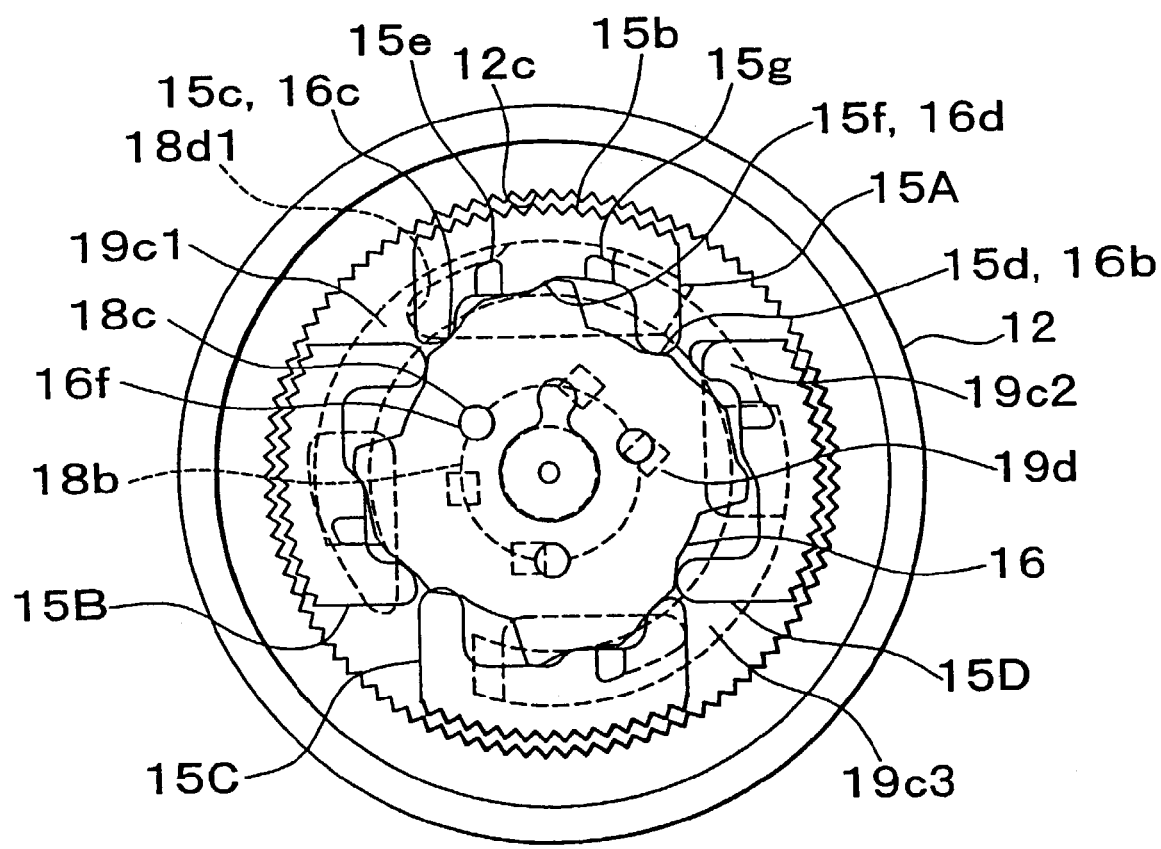
FIG. 4 is a front view of the reclining device with some of its components removed, with the slide pawls out of engagement with the ratchet.
Figure 5:
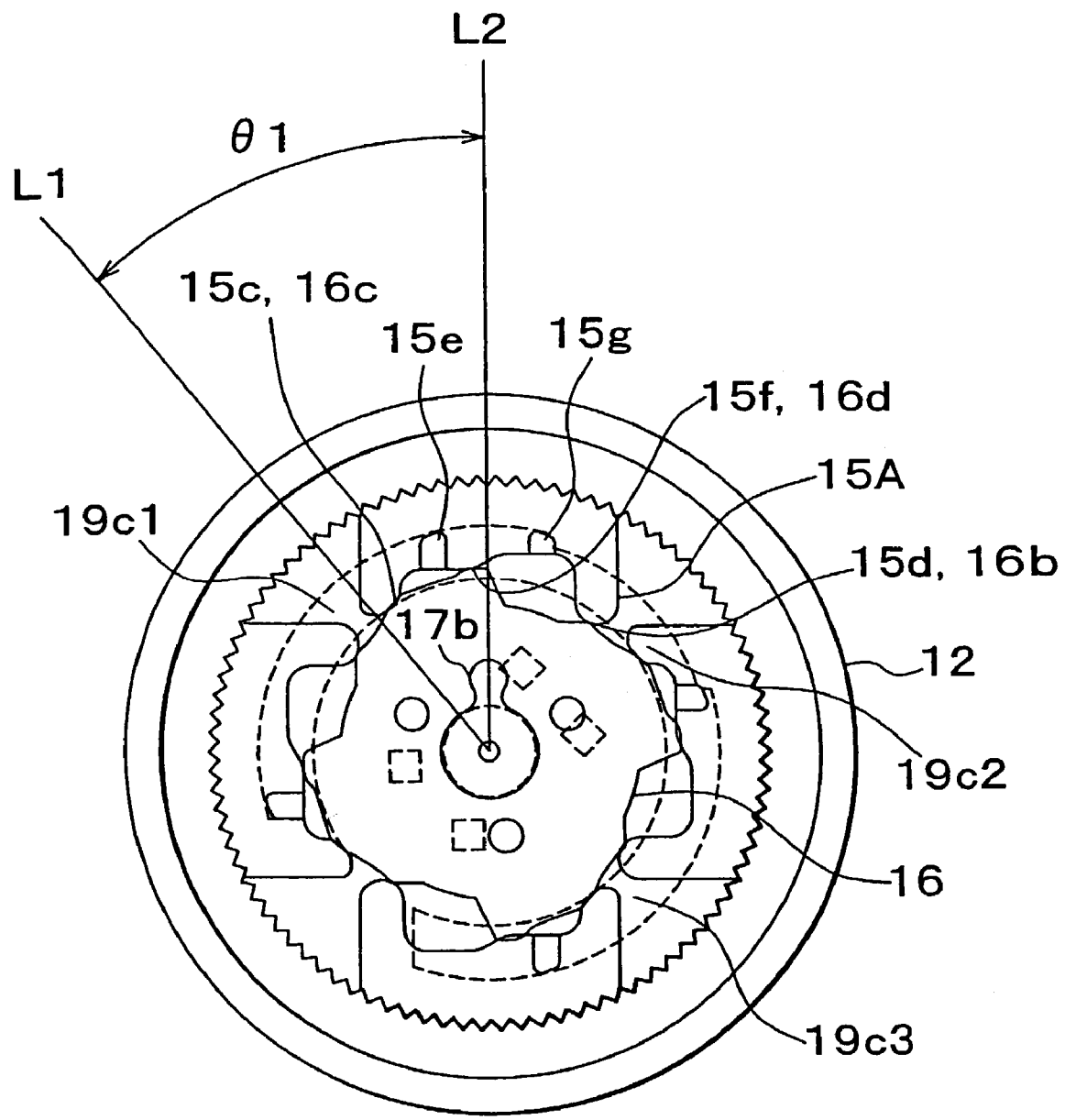
FIG. 5 is a front view of the reclining device with a movable disc, the slide pawls, the ratchet and an unlock plate in one operative state.

Hereinafter, the invention will be described with reference to the drawings. FIG. 1 is a longitudinal sectional view of a reclining device 1 according to an embodiment of the invention, and corresponds to a section indicating line I—I shown in FIG. 3. FIG. 2 is an exploded perspective view of the reclining device 1. FIGS. 3 and 4 are front views of the reclining device 1 removed of some of its components. The reclining device 1 is designed to constitute a vehicular reclining seat. The reclining device 1 is composed of a stationary disc 11, a movable disc 12, a support shaft 13, an operation lever 14, four slide pawls 15 (15A, 15B, 15C, 15D), a rotating cam 16, an operation arm 17, a working plate 18, an unlock plate 19, a spiral spring 21 and a set plate 22. In this construction, the stationary disc 11 functions as a holder of the invention. The movable disc 12 includes a ratchet of the invention. According to one aspect of the invention, the rotating cam 16 and the working plate 18 function as a cam body unit. Alternatively, the rotating cam 16 can be integrated with any suitable component that operates to retract the pawls 15, such as with a resilient spring. The slide pawl 15A corresponds to "at least one of the pawls" of the invention. A radially outside inner peripheral surface of a small-width hole portion 19c2, which will be described below, corresponds to an edge of the invention. A cam pin 15e and an unlock cam pin 15g, which will also be described below, correspond to an engagement portion of the invention. The unlock plate 19 corresponds to an unlock member of the invention.

The stationary disc 11 is mounted on the side of a seat cushion of a vehicular seat, whereas the movable disc 12 is mounted on the side of a seat back of the vehicular seat. The stationary disc 11 and the movable disc 12 are fitted facing each other. The stationary disc 11 and the movable disc 12 are integrated by bending a leading end of a tubular portion 22b of a set plate 22 fitted from the side of the movable disc 12 onto an outer peripheral edge of the stationary disc 11. As will be described below, the slide pawls 15, the rotating cam 16, the operation arm 17, the working plate 18, the unlock plate 19 and the spiral spring 21 are stored in a storage space portion formed by the stationary disc 11 and the movable disc 12. The support shaft 13 penetrates the operation arm 17, and the support shaft 13 and the operation arm 17 are connected to each other to transmit.

As shown in FIG. 2, the stationary disc 11 has a stepped circular recess 11b inside a disc body 11a. An assembly groove 11c that intersects in the shape of a crucifix and that extends both lengthwise and widthwise is formed in the circular recess 11b. The assembly groove 11c is much deeper than the circular recess 11b. Four outer corner portions of an intersecting portion of the assembly groove 11c are receptive support wall portions 11d, which assume a generally triangular shape. The receptive support wall portions 11d are as thick as the disc body 11a. A through-hole 11e and catch grooves 11f are formed in a central portion of the circular recess 11b.

As shown in FIG. 2, the movable disc 12 has a stepped circular recess 12b inside a disc body 12a. Inner teeth are formed along the entire circumference of an inner periphery of an annular portion, which is a large-diameter portion outside the circular recess 12b. The annular portion is formed as a ratchet 12c. The disc body 12a is dimensioned such that it is tightly fitted into the circular recess 11b of the stationary disc 11 when superposed onto the side of an inner face of the stationary disc 11. A through-hole 12d facing the through-hole 11e of the stationary disc 11 is formed in a center of the circular recess 12b. Furthermore, four engaging protrusion portions 12e are arranged circumferentially at the center of the circular recess 12b at intervals of a certain distance.

Although all the slide pawls 15 (15A, 15B, 15C, 15D) are essentially identical in configuration, the slide pawl 15A is different in its specific function from the other slide pawls 15B, 15C and 15D. Therefore, when referring to the specific function of the slide pawl 15A in the following description of the slide pawls 15 (15A, 15B, 15C, 15D), the slide pawl 15A will be referenced as distinct from the slide pawls 15B, 15C and 15D. Elsewhere, however, all the slide pawls 15A, 15B, 15C and 15D will be referenced generically as the slide pawl 15.

As shown in FIGS. 2 to 4, the slide pawl 15 has at a top portion of a generally arcuate pawl body 15a (radially outside with the reclining device 1 assembled) a teeth portion 15b that can engage the ratchet 12c of the movable disc 12. Further, the slide pawl 15 has on the side opposite the top portion of the pawl body 15a (radially inside with the reclining device 1 assembled) a pair of right and left leg portions 15c, 15d. Furthermore, a cam pin 15e, which is generally in the shape of a square pole and which protrudes toward the after-mentioned working plate 18 with the reclining device 1 assembled, is formed on the side opposite the top portion of the pawl body 15a at a position close to an end leg 15c. As for the slide pawls 15, the cam pin 15e of the slide pawl 15A is slightly longer than cam pins 15e of the other slide pawls. Only the slide pawl 15A has the unlock cam pin 15g. The unlock cam pin 15g is also formed generally in the shape of a square pole. Similarly to the cam pin 15e, the unlock cam pin 15g is also formed on the side opposite the top portion of the pawl body 15a at a position close to the end leg 15d, in such a manner as to protrude toward the working plate 18. The unlock cam pin 15g is as long as the cam pin 15e of the slide pawl 15A.

The rotating cam 16 is a generally circular plate. As shown in FIGS. 2 to 4, the rotating cam 16 has at an outer peripheral edge of the cam body 16a four cam portions each of which is composed of receptive support cam portions 16b, 16c and 16d. The four cam portions are arranged circumferentially and equidistantly. A fitting hole 16e, which is substantially identical in shape to the after-mentioned operation arm 17 and into which the operation arm 17 can be fitted, is formed in a central portion of the cam body 16a. Three engaging protrusion portions 16f are formed at intervals of a certain distance along a circumference stretching around a rotation center of the cam body 16a. The engaging protrusion portions 16f protrude toward the after-mentioned working plate 18 with the reclining device 1 assembled.

As shown in FIGS. 2 to 4, the operation arm 17 has on a cylindrical body 17a an engaging arm portion 17b protruding outwardly. The operation arm 17 is substantially identical in shape to the fitting hole 16e of the rotating cam 16.

The working plate 18 has a circular shape. As shown in FIG. 2, the working plate 18 has a circular through-hole 18b in a central portion of a plate body 18a. Three engaging holes 18c, which are arranged circumferentially at intervals of a certain distance, are formed in an inner peripheral edge of the through-hole 18b. Further, four cam grooves 18d1, 18*d*2, 18*d*3 and 18*d*4, which are arranged circumferentially at intervals of a certain distance, are formed in an outer peripheral side portion of the plate body 18*a*. The cam groove 18*d*1 has a generally arcuate shape. Further, the cam grooves 18*d*2, 18*d*3 and 18*d*4 are generally fan-shaped and identical in shape to one another. Part of an arc of the cam groove 18*d*1 is identical in shape to arcs of the cam grooves 18*d*2, 18*d*3 and 18*d*4. Each of the arcs extends gently from one end to the other end thereof approaching to a center. The cam groove 18*d*1 is located facing the unlock cam pin 15*g* and the cam pin 15*e* of the slide pawl 15A.

As shown in FIGS. 2 to 4, the unlock plate 19 is a circular disc. A through-hole 19*b* is formed in a central portion of a plate body 19*a*. Four engaging holes 19*d* are formed circumferentially at the center of the plate body 19*a*. Further, an arcuate long hole 19*c* is formed on the side of an outer peripheral edge of the unlock plate 19 in such a manner as to extend along the outer peripheral edge. The long hole 19*c* is composed of a large-width hole portion 19*c*1, a small-width hole portion 19*c*2 and a large-width hole portion 19*c*3. The large-width hole portions 19*c*1, 19*c*3 are equal in length and width. The small-width hole portion 19*c*2 is smaller in outer diameter than the large-width hole portions 19*c*1, 19*c*3. The long hole 19*c* is located facing the unlock cam pin 15*g* and the cam pin 15*e* of the slide pawl 15A.

The spiral spring 21 has a predetermined number of turns. As shown in FIG. 2, an inner end 21*a* of the spiral spring 21 is wound rectangularly. An outer end 21*b* of the spiral spring 21 protrudes outwardly. The inner end 21*a* is so dimensioned as to be tightly fitted onto the cylindrical body 17*a* of the operation arm 17. The outer end 21*b* is so formed as to be caught in one of the catch grooves 11*f* of the stationary disc 11.

As shown in FIG. 2, the set plate 22 has a tubular portion 22*b* on an outer peripheral edge of an annular plate body 22*a*. The set plate 22 is dimensioned such that it can be fitted to the outer peripheral side of the stationary disc 11 from the side of the movable disc 12 when the stationary disc 11 and the movable disc 12 are fitted together. As shown in FIG. 1, with the set plate 22 fitted onto the movable disc 12 and the stationary disc 11, a leading end of the tubular portion 22*b* is caulked so that the stationary disc 11 and the movable disc 12 are integrated.

These components are assembled, e.g., according to a sequence described below, thus constituting the reclining device 1 constructed as shown in FIG. 1. That is, the spiral spring 21, the operation arm 17, the rotating cam 16, the slide pawls 15, the working plate 18, the unlock plate 19 and the movable disc 12 are assembled in this order. Then the support shaft 13 passes through the through-hole 11*e* and the support 13 connects whith an inner cylinder of the cylindrical body 17*a* of the operation arm 17. Then, the set plate 22 is fitted to the outer periphery of the stationary disc 11 from the side of the movable disc 12. Finally, as shown in FIG. 1, the leading end of the tubular portion 22*b* of the set plate 22 is bended onto the outer peripheral edge of the stationary disc 11. Thus, the reclining device 1 is completed.

In this state of assembly, the outer end 21*b* of the spiral spring 21 is caught in one of the catch grooves 11*f* of the stationary disc 11. The operation arm 17 is inserted into the spiral spring 21. The inner end 21*a*, the shape of which is approximately square, of the spiral spring 21 is fixed with a periphery of the cylindrical body 17*a*, the shape of which is approximately square corresponding to the shape of the inner end 21*a* of the spiral spring 21. The rotating cam 16 is fitted onto the operation arm 17. An engaging arm 17*b* of the operation arm 17 is fitted in the fitting hole 16*e* of the rotating cam 16. The slide pawls 15 are radially slidably disposed in the assembly groove 11*c* of the stationary disc 11. The slide pawls 15 are prevented from moving circumferentially by the receptive support wall portions 11*d*. The slide pawls 15 are located on an outer periphery of the rotating cam 16 and arranged circumferentially at intervals of a certain distance. The leg portions 15*c*, 15*d* of each of the slide pawls 15 abut on the receptive support cam portions 16*c*, 16*b* of the rotating cam 16 respectively. Further, an inner surface portion 15*f* of the slide pawl 15 abuts on the receptive support cam portion 16*d*, in this state, as shown in FIG. 3, the teeth portion 15*b* of each of the slide pawls 15 meshes with a portion of the ratchet 12*c* of the movable disc 12 which faces the teeth portion 15*b*.

Further, in this state of assembly, the working plate 18 is located facing the rotating cam 16 and the slide pawls 15. Each of the engaging protrusion portions 16*f* of the rotating cam 16 is in engagement with a corresponding one of the engaging holes 18*c* of the working plate 18. Thus, the working plate 18 is coupled with the rotating cam 16 and can rotate together therewith. The cam pin 15*e* of each of the slide pawls 15 is opposed to a corresponding one of the cam grooves 18*d* of the working plate 18. Thus, the cam pin 15*e* of each of the slide pawls 15 and the corresponding one of the cam grooves 18*d* of the working plate 18 constitute a cam mechanism that causes the slide pawl 15 to slide radially.

Further, in this state of assembly, the unlock plate 19 is located facing the slide pawls 15 with the working plate 18 interposed therebetween, and is located also in the circular recess 12*b* of the movable disc 12. In this state, the unlock plate 19 is coupled with the movable disc 12 such that they can rotate together circumferentially, with the engaging protrusion portions 12*e* of the movable disc 12 in engagement with the engaging holes 19*d*. Further, the cam pin 15*e* and the unlock cam pin 15*g* of the slide pawl 15A are opposed to the long hole 19*c* of the unlock plate 19 by the cam groove 18*d*1 of the working plate 18. Thus, the cam pin 15*e* and the unlock cam pin 15*g* of the slide pawl 15A and the long hole 19*c* of the unlock plate 19 constitute a cam mechanism that causes the slide pawl 15A to slide radially.

Next, operation of the reclining device 1 will be described with reference to FIGS. 3 to 16.

FIGS. 3 and 4 are front views of the reclining device 1 removed of the stationary disc 11, the support shaft 13 and the spiral spring 21. FIG. 3 shows a state where the slide pawls 15 mesh with the ratchet 12*c* of the movable disc 12 so that a seat back S1 is locked with respect to a seat cushion S2. FIG. 4 shows a state where the slide pawls 15 have been retreated (moved away) from the ratchet 12*c* by turning the operation lever 14 so that the slide pawls 15 do not mesh with the ratchet 12*c*.

FIGS. 5, 7, 9, 11, 13 and 15 each show an operational relation among the movable disc 12, the ratchet 12*c*, the slide pawls 15 and the unlock plate 19 when the reclining device 1 is in operation. FIGS. 5, 7, 9, 11, 13 and 15 are front views showing the reclining device 1 removed of components other than the movable disc 12, the ratchet 12*c*, the slide pawls 15 and the unlock plate 19. These drawings show the reclining device 1 that is installed to the left of a passenger when he or she is seated. FIGS. 6, 8, 10, 12, 14 and 16 are side views of a reclining seat with its seat back in a tilt state corresponding to FIGS. 5, 7, 9, 11, 13 and 15 respectively.

In the reclining device 1, if the operation lever 14 has not been operated, the leg portions 15*c*, 15*d* and the inner surface portion 15*f* of each of the slide pawls 15 abut on the receptive support cam portions 16c, 16b and 16d respectively, as shown in FIG. 3. Each of the slide pawls 15 meshes with a portion of the ratchet 12c of the movable disc 12 which faces the corresponding one of the slide pawls 15. A spring force is applied to the rotating cam 16 by the spiral spring 21 by the operation arm 17 counterclockwise, so that the rotating cam 16 is held at such an angle that it abuts on the slide pawls 15. As a result, the slide pawls 15 and the ratchet 12c are maintained in mesh with each other. This meshing state prevents the stationary disc 11 and the movable disc 12 of the reclining device 1 from rotating relative to each other, and is in a locked state of the seat back S1 in relation to the seat cushion S2. Consequently, the meshing state prevents the seat back S1 from being turned longitudinally (i.e., tilted) with respect to the seat cushion S2.

In the meshing state of the reclining device 1 shown in FIG. 3, the seat back S1 stands upright at a foremost tilt position (initial-stage lock position) with respect to the seat cushion S2. The unlock cam pin 15g of the slide pawl 15A coupled with the unlock plate 19 is located in a stepped portion forming a border with the small-width hole portion 19c2 in the large-width hole portion 19c1 of the long hole 19c of the unlock plate 19.

In the reclining device 1 assuming this meshing state, the operation lever 14 is rotated counterclockwise to unlock the seat back S1 from the seat cushion S2. Then, the operation arm 17 rotates clockwise by the support shaft 13, so that the rotating cam 16 rotates clockwise by a predetermined amount. As a result, the receptive support cam portions 16b, 16c and 16d of the rotating cam 16 are brought out of abutment on the leg portions 15d, 15c and the inner surface portion 15f of each of the slide pawls 15 respectively. Thus, the rotating cam 16 stops holding the slide pawls 15. The rotating cam 16 makes the slide pawls 15 free to move radially inwardly, and the working plate 18 rotates together with the rotating cam 16. At this moment, the working plate 18 radially inwardly presses the cam pins 15e of the slide pawls 15 by the outside inner peripheral surfaces of the cam grooves 18d, thus causing the cam pins 15e to slide. The working plate 18 brings the slide pawls 15 out of mesh with the ratchet 12c by retreating the slide pawls 15 from the ratchet 12c. FIG. 4 shows a state where the slide pawls 15 have retreated from the ratchet 12c and are out of mesh therewith.

In the state where the slide pawls 15 are out of mesh with the ratchet 12c, the movable disc 12 can rotate with respect to the stationary disc 11 both clockwise and counterclockwise. The seat back S1 has been unlocked from the seat cushion S2. Therefore, the seat back S1 can tilt with respect to the seat cushion S2. The seat back S1 can tilt backwards until it becomes substantially horizontal or can be folded forwards toward the seat cushion S2 until it becomes substantially horizontal.

Figure 6:
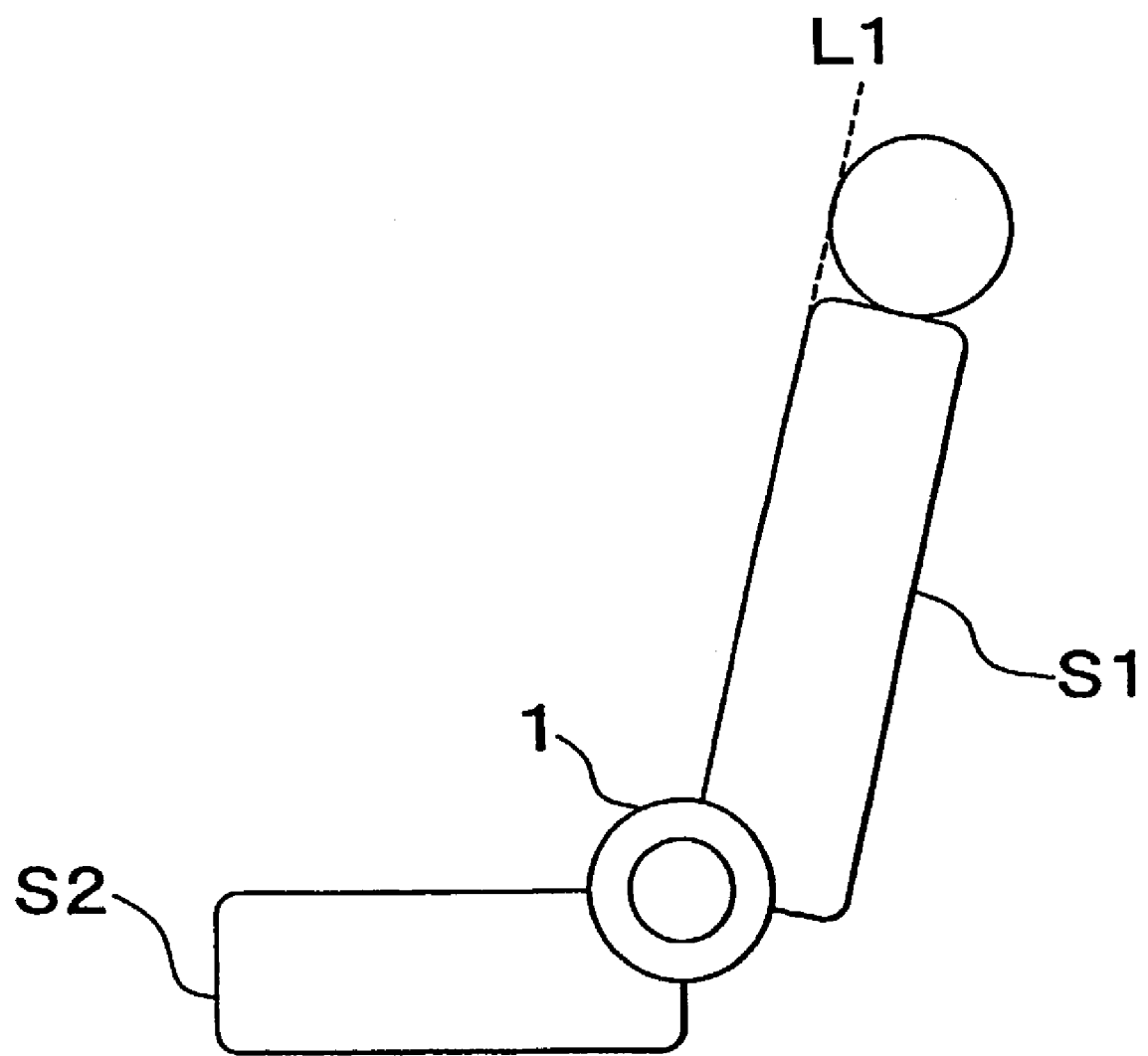
FIG. 6 is a side view of the reclining seat assuming an initial-stage lock position.

Next, a procedure of tilting the seat back S1 of the reclining seat equipped with the reclining device 1 backwards from the initial-stage lock position will be described with reference to FIGS. 5 to 8. A base line L1 shown in FIG. 5 indicates an initial-stage lock position of the seat back S1. The seat back S1 shown in FIG. 6 is set substantially upright at the initial-stage lock position, i.e., along the base line L1. First of all, the operation lever 14 is turned to rotate the rotating cam 16 and the working plate 18 clockwise by a predetermined amount. Thus, the slide pawls 15 retreat from the ratchet 12c and are brought out of mesh therewith. In a state where the slide pawls 15 and the ratchet 12c are out of mesh with each other, if the seat back S1 tilts backwards with respect to the seat cushion S2, the movable disc 12 turns clockwise. Then, if turning operation of the operation lever 14 is stopped as soon as the movable disc 12 has turned by a predetermined amount, the support shaft 13 and the operation arm 17 rotate counterclockwise due to a spring force of the spiral spring 21. Then, the rotating cam 16 returns while rotating counterclockwise, so that the slide pawls 15 move toward the ratchet 12c and come into mesh therewith. Thus, the movable disc 12 is prevented from rotating relative to the stationary disc 11, and the seat back S1 is locked while forming a desired tilt angle with the seat cushion S2. The seat back S1 and the seat cushion S2 are maintained in this state.

In the reclining device 1, while the movable disc 12 rotates, the long hole 19c of the unlock plate 19 overlaps with the cam pin 15e and the unlock cam pin 15g of the slide pawl 15A. In a range where the large-width hole portion 19c1 of the long hole 19c of the unlock plate 19 overlaps with the cam pin 15e and the unlock cam pin 15g, the ratchet 12c side of the cam pin 15e and the unlock cam pin 15g of the slide pawl 15A are made open by the large-width hole portions 19c1, 19c3, so that the cam pin 15e and the unlock cam pin 15g are allowed to move toward the ratchet 12c. In other words, the slide pawls 15 are allowed to move toward the ratchet 12c. Therefore, the slide pawls 15 can move toward the ratchet 12c and come into mesh therewith. Further, these meshing states can be released by turning the operation lever 14. Accordingly, the seat back S1 can be arbitrarily adjusted in tilt angle with respect to the seat cushion S2.

Figure 7:
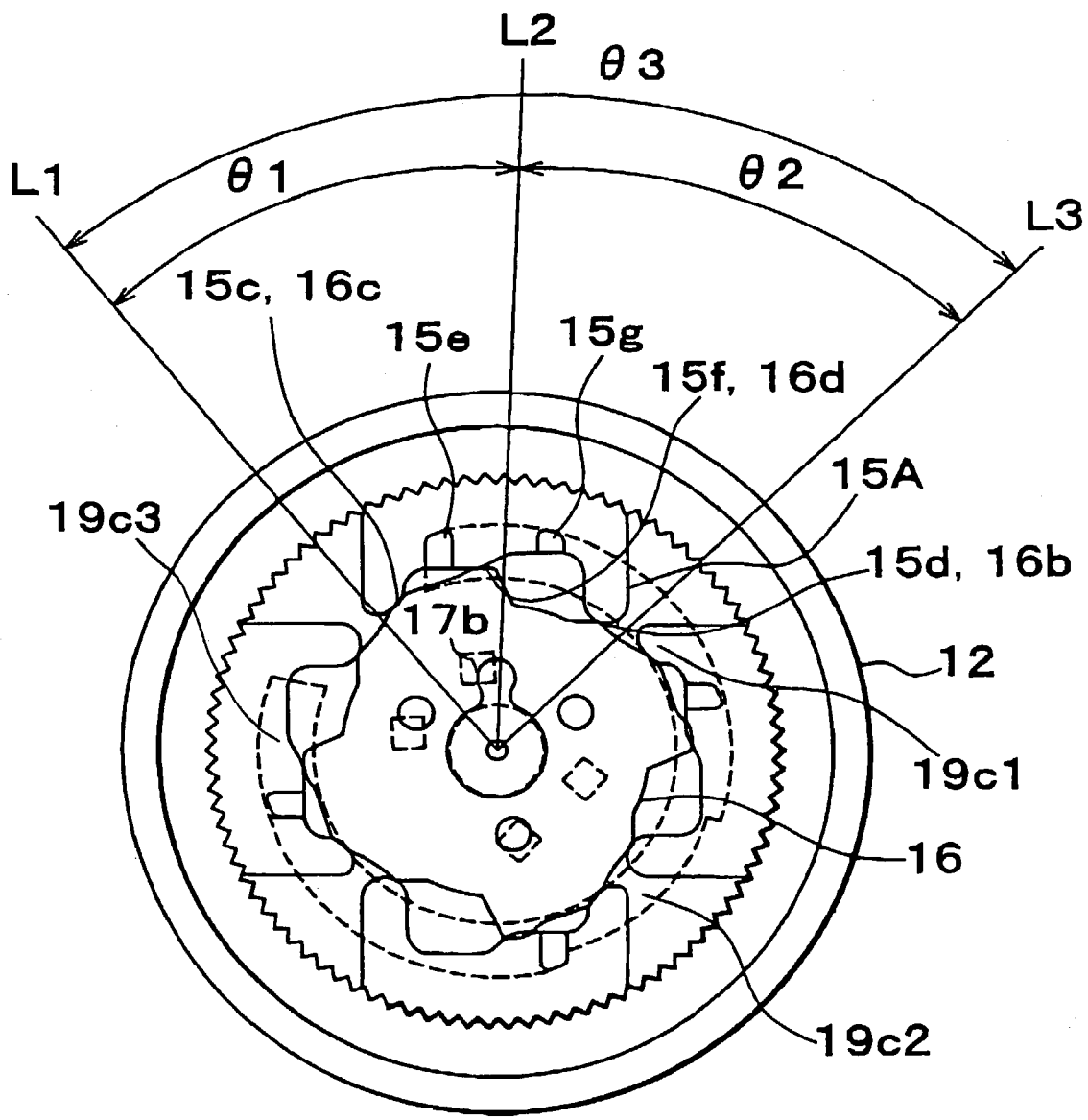
FIG. 7 is a front view of the reclining seat in another operative state.
Figure 8:
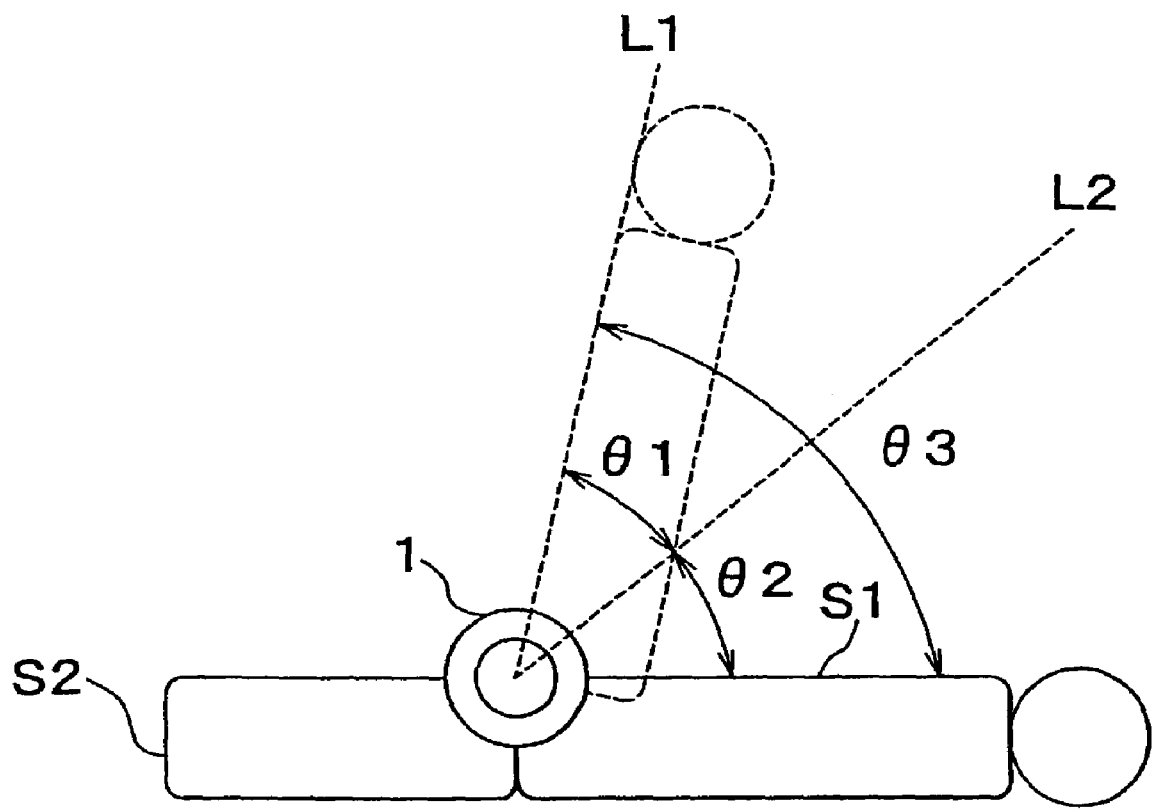
FIG. 8 is a side view of the reclining seat in the state shown in FIG. 7.

A base line L3 shown in FIG. 7 indicates a final-stage lock position. In the reclining device 1, the tilt angle of the seat back S1 can be adjusted within an angular range θ3, which is the sum of an angular range θ1 between the base lines L1, L2 and an angular range θ2 between the base lines L2, L3. FIG. 8 shows a state of movement of the reclining seat corresponding to the state shown in FIG. 7.

Figure 9:
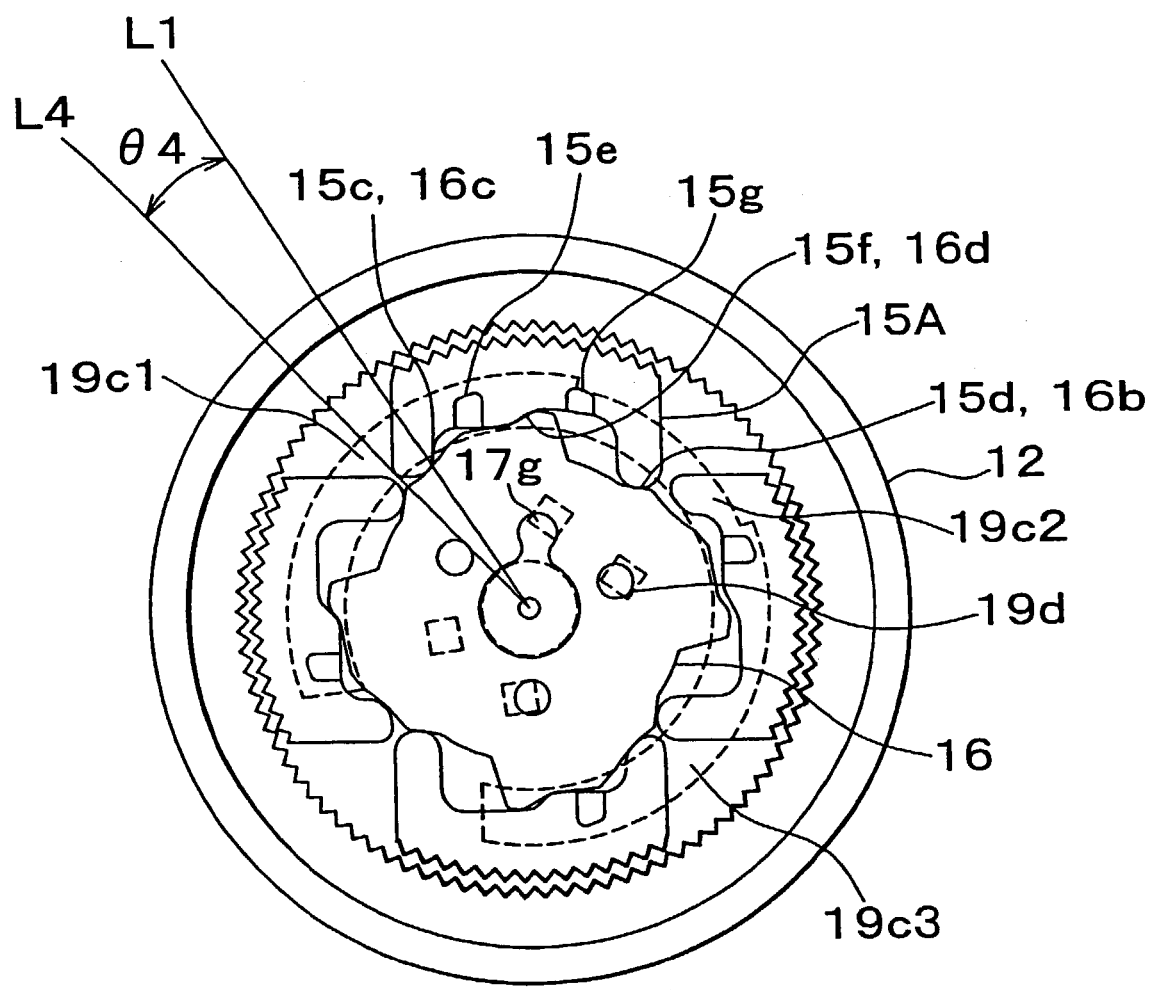
FIG. 9 is a front view of the reclining device in still another operative state.

Next, in the reclining device 1 assuming the initial-stage lock position, a procedure of folding the seat back S1 forwards toward the seat cushion S2 until it becomes substantially horizontal will be described with reference to FIGS. 5, 6 and 9 to 16. First of all, the operation lever 14 is turned to rotate the rotating cam 16 and the working plate 18 clockwise by a predetermined amount. Thus, the slide pawls 15 retreat from the ratchet 12c and are brought out of mesh therewith. Thus, the movable disc 12 becomes capable of rotating with respect to the stationary disc 11, so that the seat back S1 can tilt forwards with respect to the seat cushion S2. Because the seat back S1 tilts forwards, the movable disc 12 rotates counterclockwise together with the unlock plate 19. Then, as shown in FIG. 9, due to rotation of the unlock plate 19, the small-width hole portion 19c2 of the long hole 19c of the unlock plate 19 moves to a position corresponding to the unlock cam pin 15g of the slide pawl 15A. In this state, the radially outside inner peripheral surface of the small-width hole portion 19c2 prevents the unlock cam pin 15g from moving toward the ratchet 12c, and the slide pawl 15A is held in retreat from the ratchet 12c. Because the leg portions 15c, 15d of the slide pawl 15A abut on the receptive support portions 16c, 16b of the rotating cam 16 respectively, the rotating cam 16 does not rotate counterclockwise. Thus, since the working plate 18 does not rotate either together with the rotating cam 16, the other slide pawls 15B, 15C and 15D, which are being radially inwardly pressed by the working plate 18, are also held in retreat from the ratchet 12c. Accordingly, even if turning operation of the operation lever 14 is canceled in this state, all the slide pawls 15 are held out of mesh with the ratchet 12c.

Figure 10:
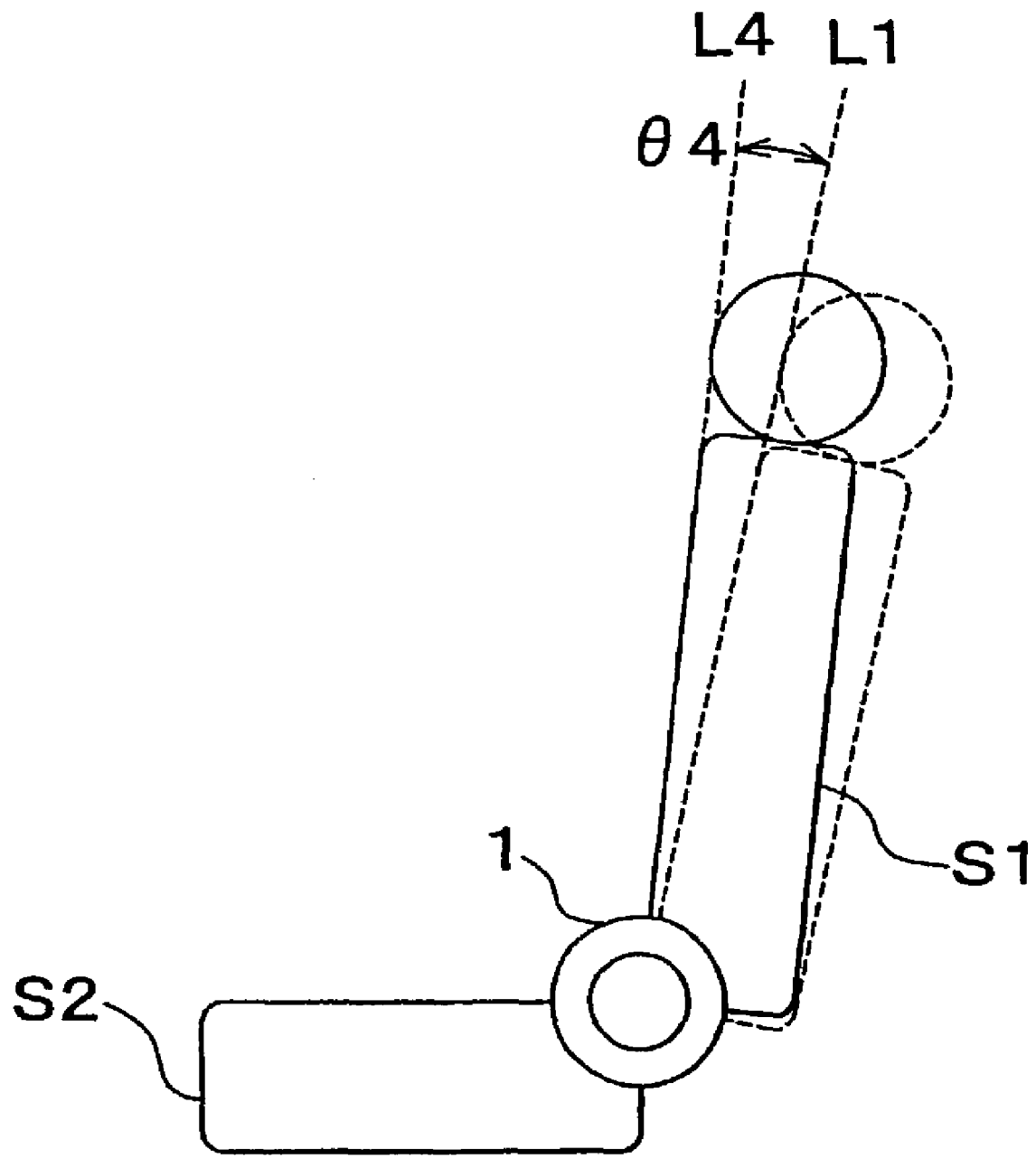
FIG. 10 is a side view of the reclining seat in the state shown in FIG. 9.

Thus, the seat back S1 is unlocked from the seat cushion S2, i.e., it assumes a free state. FIG. 10 shows a tilt state of the seat back S1 in this state.

A base line L4 shown in FIG. 9 indicates a rotational position of the seat back S1 when the small-width hole portion 19c2 of the unlock plate 19 overlaps with the unlock cam pin 15g of the slide pawl 15A. If the seat back S1 turns from the base line L1 to the base line L4 by an angle θ4, the small-width hole portion 19c2 of the unlock plate 19 moves from the initial-stage lock position to a position corresponding to the cam pin 15g of the slide pawl 15A.

Figure 11:
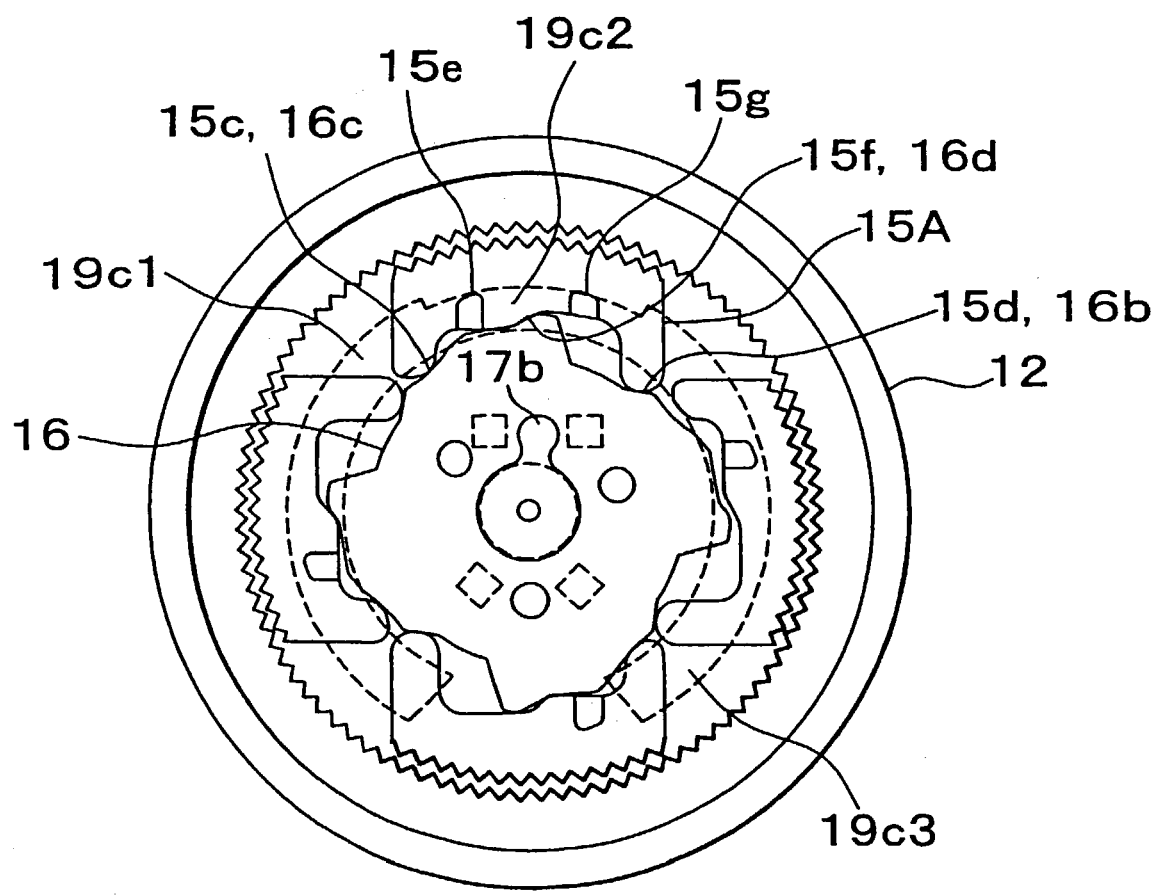
FIG. 11 is a front view of the reclining device in still another operative state.
Figure 12:
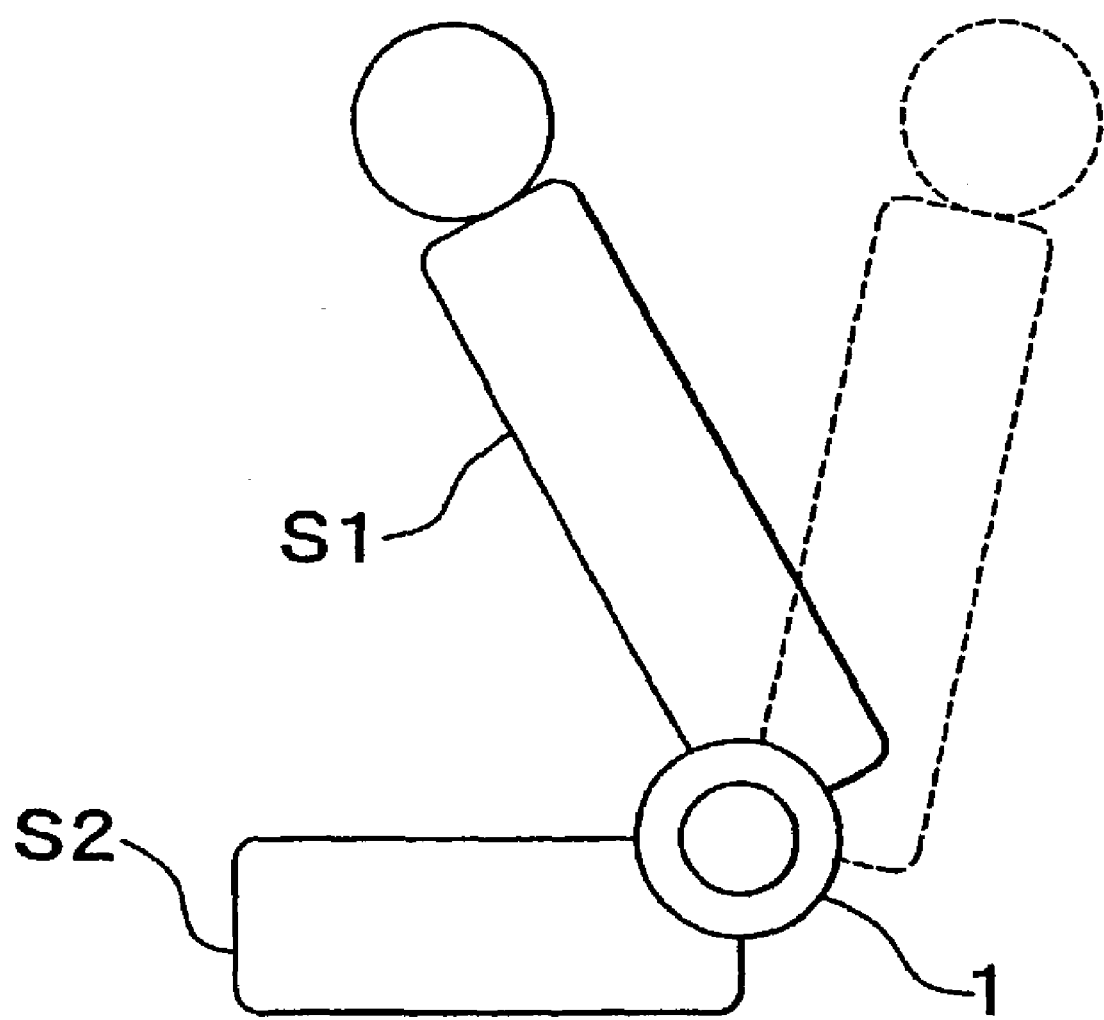
FIG. 12 is a side view of the reclining seat in the state shown in FIG. 11.

If the seat back S1 tilts further forwards, the unlock plate 19 in the reclining device 1 also rotates further counter-clockwise as shown in FIG. 11. Then, as soon as the small-width hole portion 19c2 overlaps with the unlock cam pin 15g of the slide pawl 15A, it also overlaps with the cam pin 15e. Also in this state, since the radially outside inner peripheral surface of the small-width hole portion 19c2 prevents the cam pin 15e and the unlock cam pin 15g from moving toward the ratchet 12c, the slide pawl 15A is held in retreat from the ratchet 12c. Thus, also in this state, the seat back S1 is free from the seat cushion S2. FIG. 12 is a side view showing a tilt state of the reclining seat shown in FIG. 11.

Figure 13:
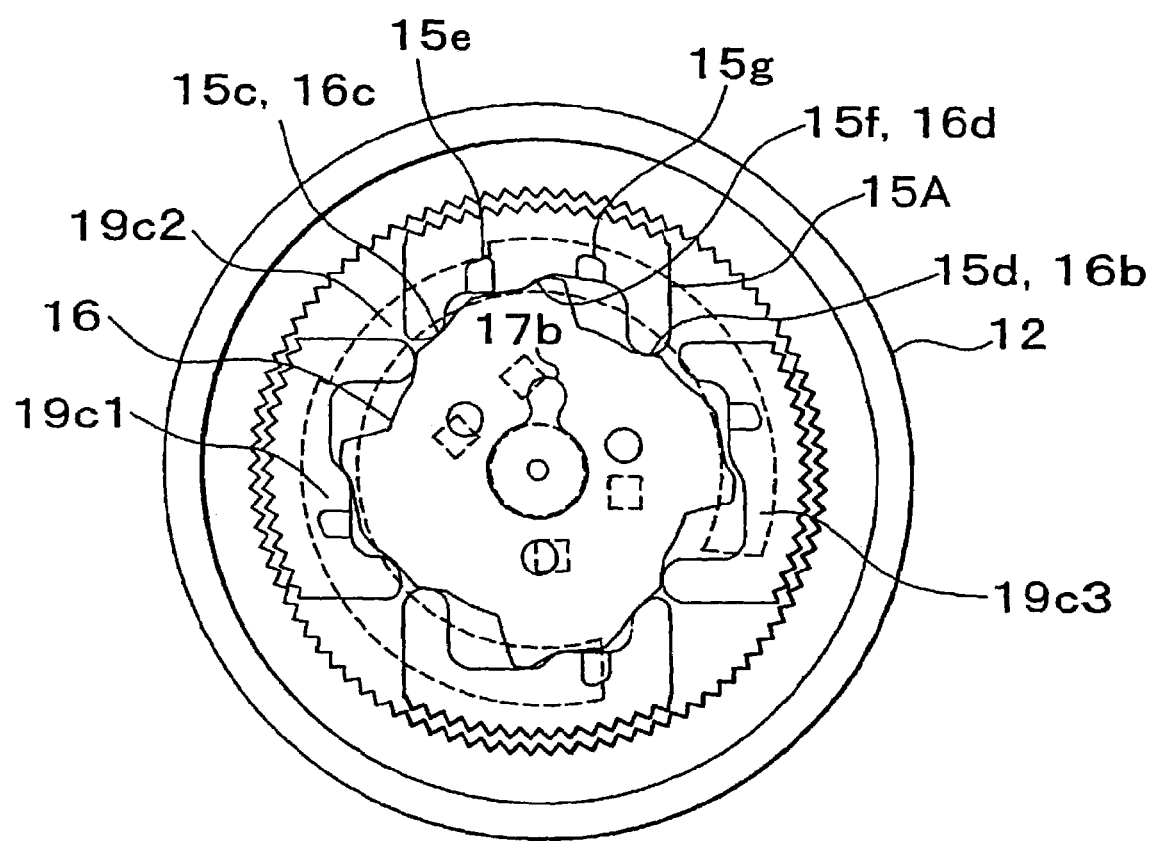
FIG. 13 is a front view of the reclining device in still another operative state.
Figure 14:
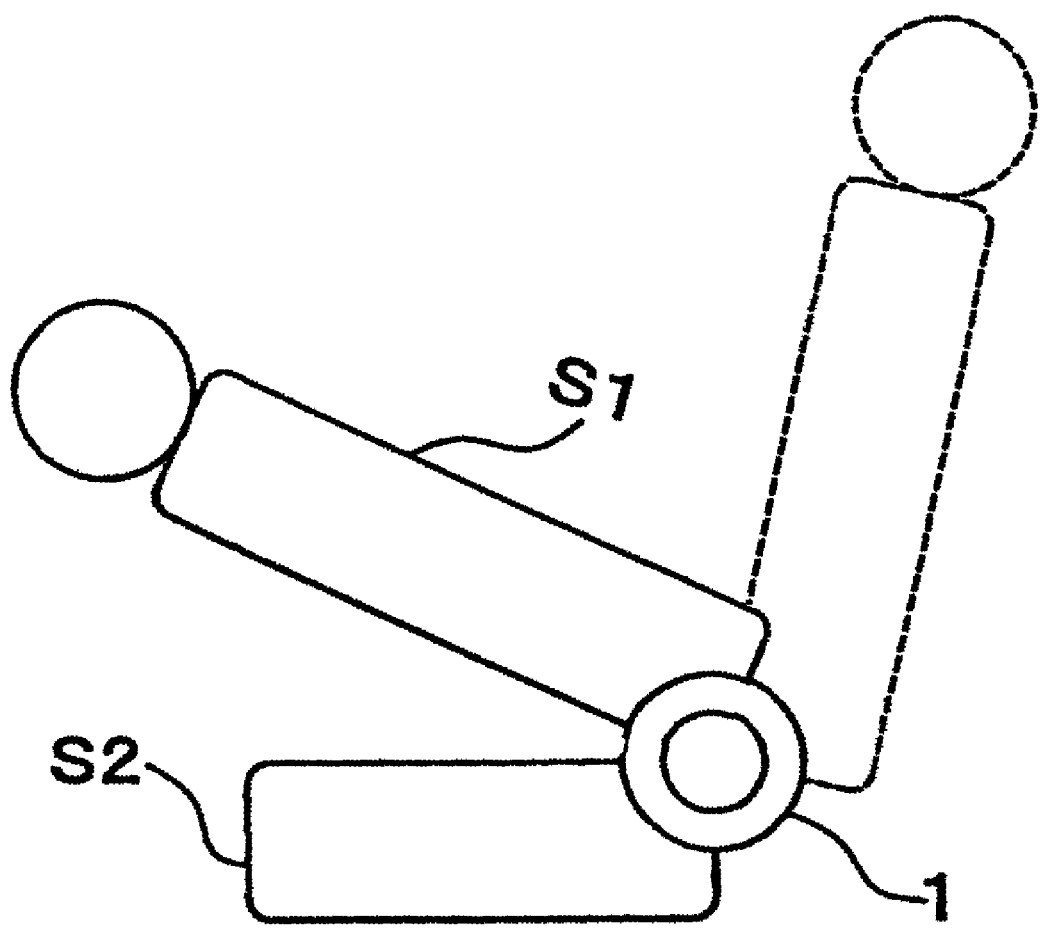
FIG. 14 is a side view of the reclining seat in the state shown in FIG. 13.

If the seat back S1 tilts further forwards and is on the verge of becoming horizontal as shown in FIG. 14, the unlock plate 19 rotates to a position shown in FIG. 13. It is to be noted herein that the small-width hole portion 19c2 of the unlock plate 19 has deviated from the position corresponding to the unlock cam pin 15g of the slide pawl 15. However, since the cam pin 15e overlaps with the small-width hole portion 19c2 and thus is prevented from moving toward the ratchet 12c, the seat back S1 is held likewise free from the seat cushion S2.

As described above, while the small-width hole portion 19c2 of the long hole 19c overlaps with at least one of the cam pin 15e and the unlock cam pin 15g of the slide pawl 15A, the movable disc 12 is free from the stationary disc 11. Thus, the seat back S1 can be folded forwards toward the seat cushion S2 until it becomes substantially horizontal.

Figure 15:
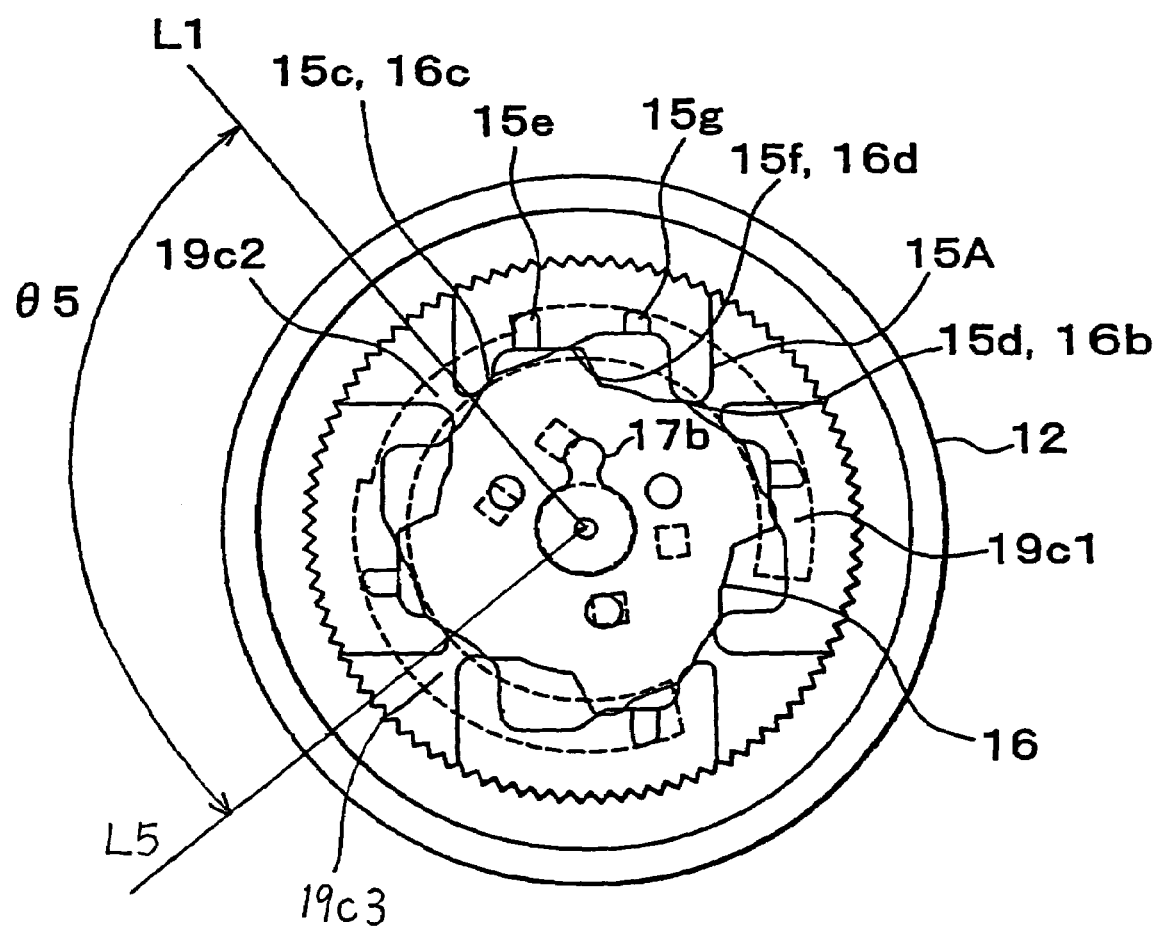
FIG. 15 is a front view of the reclining device in still another operative state.

Finally, if the seat back S1 tilts to be laid on the seat cushion S2 as shown in FIG. 16, the small-width hole portion 19c2 deviates from the positions corresponding to the cam pin 15e and the unlock cam pin 15g of the slide pawl 15A as shown in FIG. 15. At this moment, the large-width hole portion 19c1 overlaps with the cam pin 15e and the unlock cam pin 15g of the slide pawl 15A. In this state, since the ratchet 12c side of the cam pin 15e and the unlock cam pin 15g of the slide pawl 15A are made open by the large-width hole portion 19c3, the slide pawls 15 are allowed to move toward the ratchet 12c. Due to a spring force of the spiral spring 21, the rotating cam 16 and the working plate 18 return while rotating counterclockwise. Then, the rotating cam 16 causes the slide pawls 15 to move toward the ratchet 12c and brings them into mesh with the ratchet 12c. Thus, the movable disc 12 is prevented from rotating with respect to the stationary disc ii, so that the seat back S1 is locked with respect to the seat cushion S2 while lying substantially horizontally.

A base line L5 shown in FIG. 15 indicates a tilt position of the foremost folded seat back S1. If the seat back S1 turns from the base line L1 to the base line L5 by an angle θ5 (which includes the angle θ4), it is folded to become substantially horizontal.

In order to return the seat back S1 that has been folded forwards to its upright position, the operation lever 14 is turned so that the slide pawls 15 assuming the meshing state shown in FIG. 15 retreat from the ratchet 12c and come out of mesh therewith. Then, the seat back S1 is tilted backwards by a predetermined amount. Turning operation of the operation lever 14 is then cancelled to turn the seat back S1 further backwards. Since the small-width hole portion 19c2 of the unlock plate 19 overlaps with the cam pin 15e of the slide pawl 15A, the movable disc 12 is free from the stationary disc 11 and allows the seat back S1 to tilt backwards. This state corresponds to FIG. 13. If the seat back S1 is tilted backwards, it assumes the state shown in FIG. 11, the state shown in FIG. 9, and finally the state shown in FIG. 6.

In the reclining device 1, if the seat back S1 reaches the base line l,1 through the base line L4, the large-width hole portion 19c1 of the unlock plate 19 reaches the position corresponding to the unlock cam pin 15g of the slide pawl 15A. Because the ratchet 12c side of the slide pawl 15A is then made open, the slide pawl 15A is allowed to move toward the ratchet 12c. Then, as the slide pawl 15A moves toward the ratchet 12c, the slide pawls 15 are released from a state where they are spaced from the ratchet 12e. Then, due to a spring force of the spiral spring 21, the rotating cam 16 returns while rotating counterclockwise, and the slide pawls 15 move toward the ratchet 12c and come into mesh therewith. Thus, the seat back S1 is released from a state where it is free from the seat cushion S2. The seat back S1 is locked with respect to the seat cushion S2 at the initial-stage lock position corresponding to the base line L1 and is held almost upright at a predetermined tilt angle.

As described above, the reclining device 1 employs the unlock plate 19 to hold a specific one of the slide pawls 15, i.e., the slide pawl 15A in retreat in such a direction that the slide pawl 15A is brought out of mesh with the ratchet 12c. Then, the slide pawl 15A operates the working plate 18 and the rotating cam 16 so that all the slide pawls 15 are held in retreat in such a direction that they are brought out of mesh with the ratchet 12c. Thus, all the slide pawls 15 are brought out of mesh with the ratchet 12c.

Therefore, if the unlock plate 19 holds only one of the slide pawls 15, i.e., the slide pawl 15A in retreat from the ratchet 12c, all the slide pawls 15 can be held out of mesh with the ratchet 12c, and free zones of the slide pawls 15 can be formed. These free zones can be set even if the angular range where the slide pawl 15A is brought out of mesh with the ratchet 12c and the angular range where the adjacent slide pawls 15B, 15D are to mesh with the ratchet 12c overlap with each other in a plan view.

The reclining device 1 is designed to be attached to a hinge portion between the seat cushion S2 and the seat back S1 so as to constitute a vehicular reclining seat. The reclining device 1 is adapted for a vehicular reclining seat as will be mentioned below.

That is, as shown in FIGS. 5 to 16, the reclining device 1 is set such that a lock state is constituted, i.e., that the slide pawls 15 can mesh with the ratchet 12c (1) if the seat back S1 forms an angle larger than a predetermined angle with the seat cushion S2 (on the side from the base line L1 to the base lines L2, L3). The reclining device 1 is set such that a lock state is not constituted, i.e., that the slide pawls 15 cannot mesh with the ratchet 12c (2) if the seat back S1 forms an angle smaller than the predetermined angle with the seat cushion S2 (on the side from the base line L1 to the base lines L4, L5). The reclining device 1 is set such that a lock state is constituted, i.e., that the slide pawls 15 mesh with the ratchet 12c (3) if the seat back S1 forms a minimum angle with the seat cushion S2 (at the position corresponding to the base line L5).

Accordingly, the vehicular reclining seat employing the reclining device 1 can constitute a lock state in a state where the seat back S1 has been folded down until it forms a minimum angle with the seat cushion S2, that is, until it reaches a turning position corresponding to the base line L5, i.e., becomes substantially horizontal. Thus, in the case where the seat back S1 is locked in a substantially horizontal state, even if vibrations occur while the vehicle is running, the seat back S1 can be prevented from vibrating unstably. Further, since the seat back S1 has its back portion locked in a substantially horizontal state and thus is prevented from vibrating unstably, the back portion of the seat back S1 can be utilized as a table.

As described above, the reclining device 1 is able to set the angles to be set to bring a pawl into mesh and the angles to be set to bring the pawls out of mesh in large range. And the sum of the angles to be set to bring the pawls into mesh and the angles to be set to bring the pawls out of mesh exceeds 360°.

Further, since the slide pawl 15A has two protrusion portions facing the long hole 19c of the unlock plate 19, i.e., the cam pin 15e and the unlock cam pin 15g, the small-width hole portion 19c2 of the unlock plate 19 can be reduced in length. Thus, the sufficiently long large-width hole portions 19c1, 19c3 can be formed at opposed ends of the small-width hole portion 19c2. Therefore, the same unlock plate 19 can be employed in the reclining device 1 on the other side by changing an angle for mounting the unlock plate 19 to the ratchet 12c.

Furthermore, with a simple construction in which the movable disc 12 is provided with the engaging protrusion portions 12e, the unlock plate 19 can be integrated with the movable disc 12 equipped with the ratchet 12c in the turning direction. Therefore, the free zone of the reclining device 1, which differs depending on the type of vehicles, can be dealt with easily by a means for suitably changing the unlock plate 19.

The reclining device 1 may employ a slide pawl that does not have any unlock cam pin. This construction can make the slide pawl easier.

Figure 17:
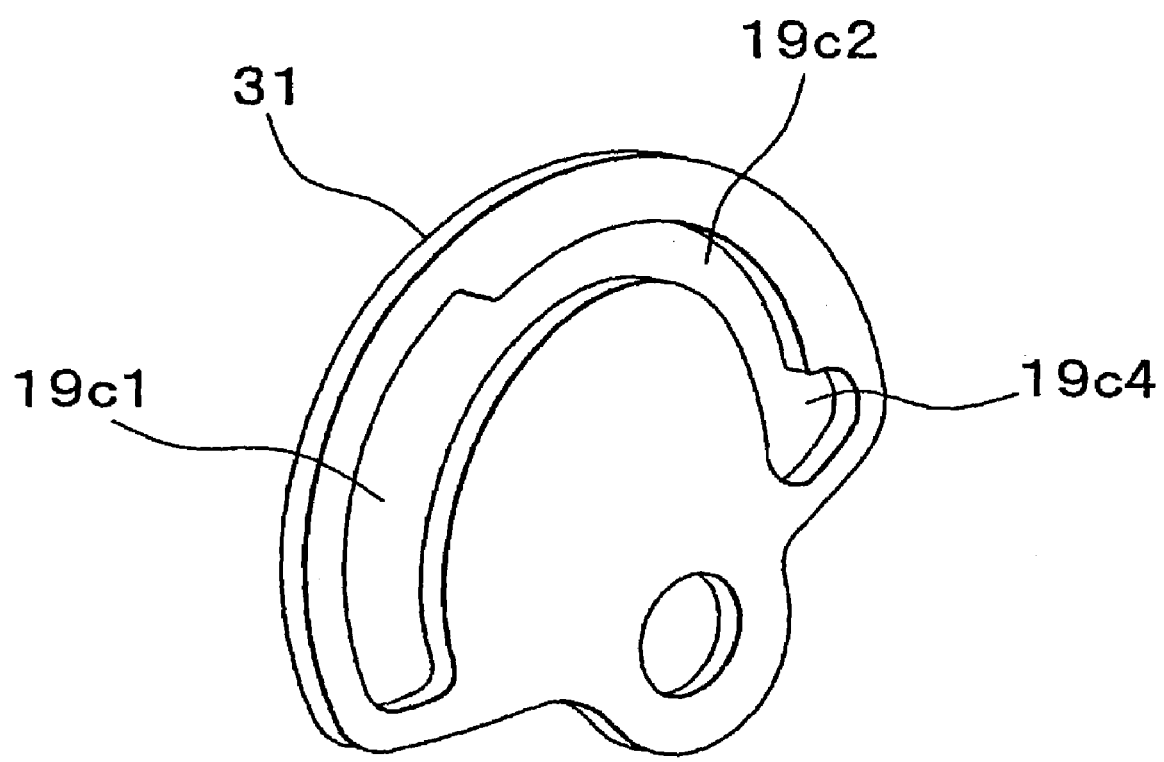
FIG. 17 is a perspective view of the unlock plate according to another embodiment of the invention.
Figure 18A:
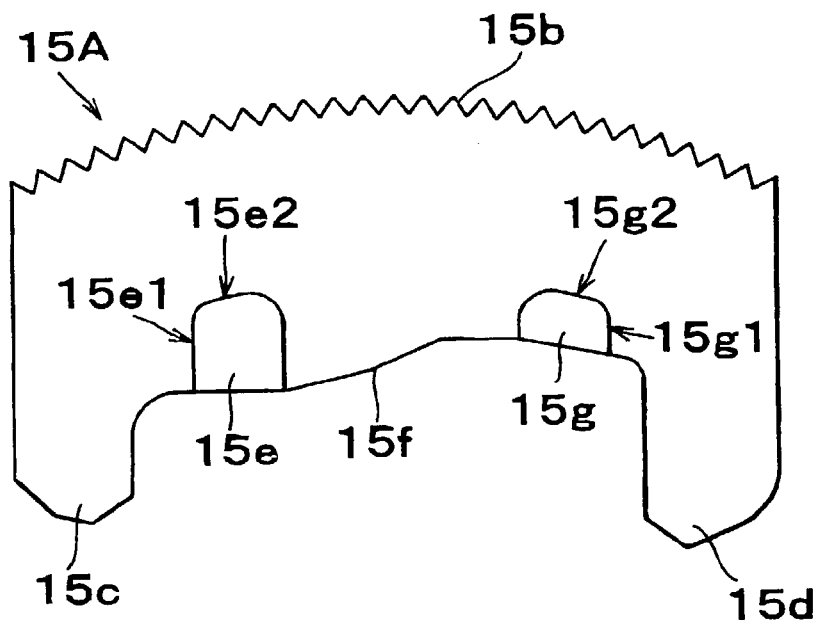
FIGS. 18A and 18B are enlarged front views of the slide pawls.
Figure 18B:
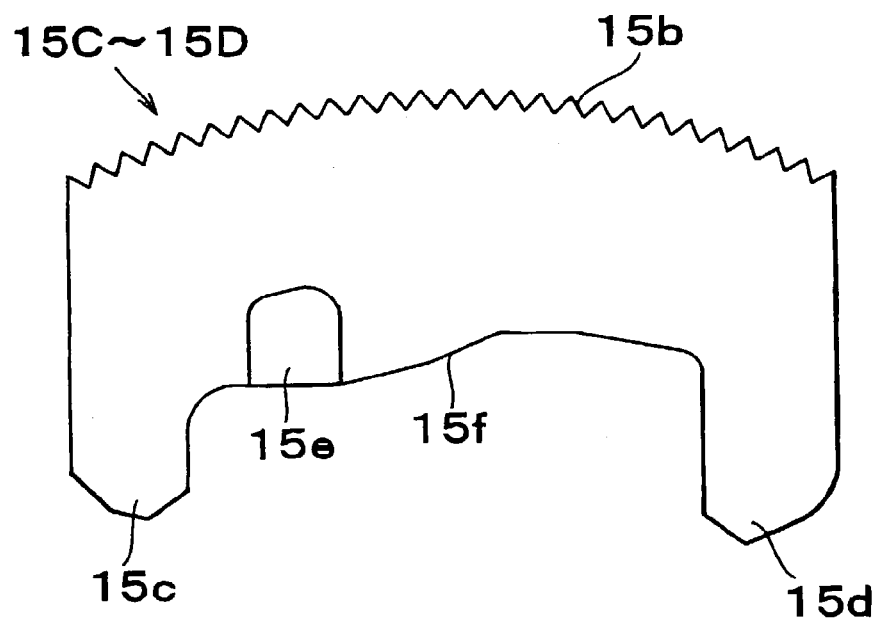

In addition, the reclining device 1 can have a generally fan-shaped unlock plate 31 as shown in FIG. 17. If a hole 19c4 is substituted for a hole corresponding to the large-width hole portion 19c3 of the long hole 19c, size reduction of parts can be achieved. The unlock plate 31 is fan-shaped and thus can be mounted easily by engaging its opposed circular ends with a pair of right and left engaging protrusion portions formed along the peripheral edge of the circular recess 12b of the movable disc 12. The engaging protrusion portions of the movable disc 12 may have an arbitrary shape. It is also possible to provide a catch portion or a protrusion portion corresponding to the engaging protrusion portions, provide the unlock plate 31 with another catch portion or another protrusion portion in which the catch portion or the protrusion portion is caught, catch these protrusion portions on these catch portions, and integrate the unlock plate 31 with the movable disc 12 in the turning direction.

In addition, the cam pins 15e, 15g that are formed in the slide pawl 15A may be constructed as described below. Namely, as shown in FIG. 15, the cam pins 15e, 15g have reference end surfaces 15e1, 15g1 respectively. Each of the reference end surfaces 15e1, 15g1 is a lateral surface (outer surface) on the other side of a corresponding one of opposed lateral surfaces (inner lateral surfaces) of the cam pins 15e, 15g. The angle formed between the reference end surface 15e1 and an outside surface 15e2 extending therefrom is set equal to the angle formed between the reference end surface 15g1 and an outside surface 15g2 extending therefrom. The arc formed by the reference end surface 15e1 and the outside surface 15e2 is made geometrically identical with the arc formed by the reference end surface 15g1 and the outside surface 15g2. This makes it possible to finely control the locus of the teeth portion 15b in the vicinity of both ends of the slide pawls 15. Further, the slide pawls 15 can be stably operated whether the stationary disc 11 and the movable disc 12 relatively rotate in one direction or the other.

Figure 19A:
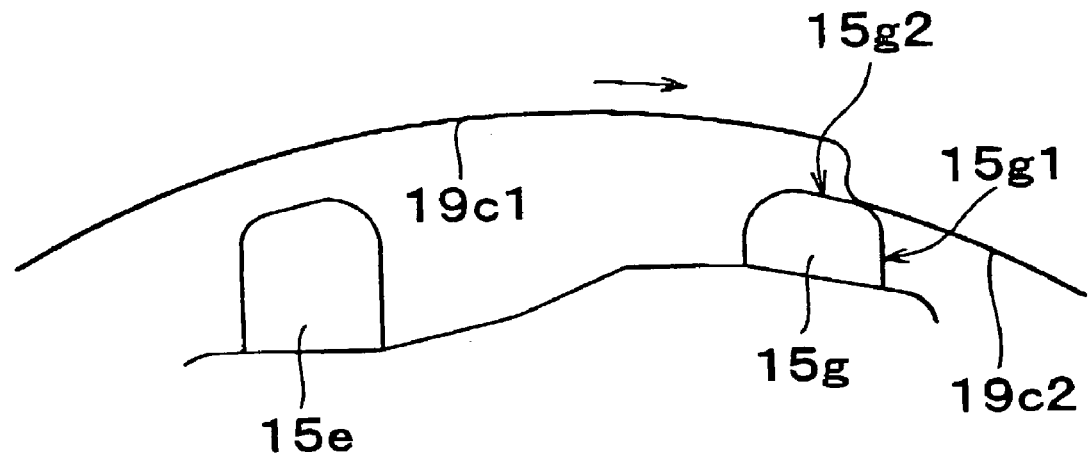
FIGS. 19A and 19B are schematic views showing one of the slide pawls that is on the verge of switching from a free zone to a lock position.
Figure 19B:
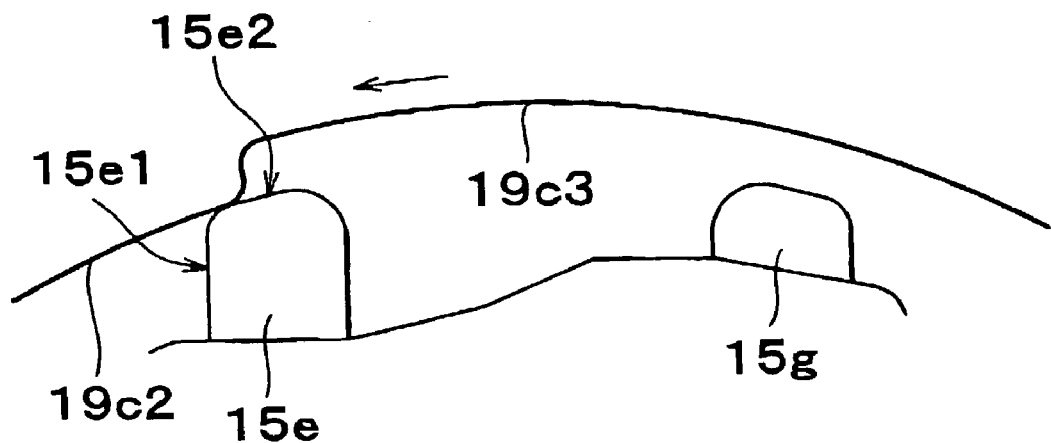

Detailed operation of the slide pawls 15 will be described with reference to FIG. 19. FIG. 19 is a schematic view of the slide pawl 15A that is on the verge of switching from a free zone to a lock position. In the case shown in FIG. 19A, the seatback S1 tilts backwards from the state shown in FIG. 9 and shifts to the state shown in FIG. 5. In the case shown in FIG. 19B, the seat back S1 tilts forwards from the state shown in FIG. 13 and shifts to the state shown in FIG. 15.

In FIG. 19A, the small-width hole portion 19c2 of the long hole 19c in the unlock plate 19 is disengaged from the cam pin 15g of the slide pawl 15A and overlaps with the left large-width hole portion 19c1, whereby the slide pawl 15A is switched from the free zone to the lock position. In FIG. 19B, the small-width portion 19c2 of the long hole 19c is disengaged from the other cam pin 15e of the slide pawl 15A and overlaps with the right large-width hole portion 19c3, whereby the slide pawl 15A is switched from the free zone to the lock position.

In general, the teeth portion 15b of the slide pawl 15 and the ratchet 12c are formed along arcs that are concentric with each other. The slide pawl 15 engages the ratchet 12 by sliding radially and rectilinearly. Referring to the movement of the reclining device 1 during a switch from the free zone to the lock state, therefore, the teeth portion 15b of the slide pawl 15 ingresses into the ratchet 12c while the slide pawl 15 and the ratchet 12c rotate relatively. In the vicinity of a widthwise central portion of the slide pawl 15, at this moment, the teeth portion 15b of the slide pawl 15 rectilinearly ingresses into the ratchet 12c and engages it. In the vicinity of both widthwise marginal portions of the slide pawl 15, on the other hand, the teeth portion 15b of the slide pawl 15 relatively diagonally ingresses into the ratchet 12c and engages it.

Accordingly, until the slide pawl 15 engages the ratchet 12c, the locus of the substantially central portion of the slide pawl 15 with respect to the ratchet 12c is apparently different from the locus of the substantially marginal portions of the slide pawls 15 relative to the ratchet 12c. As a result, the slide pawl 15 may engage the ratchet 12c at a position that is off a target position by one or two teeth. In other words, so-called "gear jumping" may occur.

Thus, the timing when the teeth portion 15b engages the ratchet 12c is controlled by the outside surfaces 15e2, 15g2 of the cam pins 15e, 15g, which are so located as to move substantially along the locus of the substantially marginal portions of the teeth portion 15b of the slide pawl 15A as described above. In this manner, "gear jumping" can be prevented. By adjusting the angles formed between the reference end surfaces 15e1, 15g1 and the outside surfaces 15e2, 15g2 of the cam pins 15e, 15g respectively or the contours of the arcs formed by them, or by adjusting the angles formed between the large-width hole portions 19c1, 19c3 and the small-width hole portion 19c2 of the long hole 19c or the contours of the arcs formed by them, it becomes possible to finely control the locus of the substantially marginal portions of the teeth portion 15b of the slide pawl 15A.

The angle formed between the reference end surface 15e1 and the outside surface 15e2 of the cam pin 15e of the slide pawl 15A is set equal to the angle formed between the reference end surface 15g1 and the outside surface 15g2 of the cam pin 15g of the slide pawl 15A. The contour of the arc formed by the reference end surface 15e1 and the outside surface 15e2 of the cam pin 15e of the slide pawl 15A is set identical with the contour of the arc formed by the reference end surface 15g1 and the outside surface 15g2 of the cam pin 15g of the slide pawl 15A. Thus, the timing when the slide pawl 15A is switched from the free zone to the lock position is stabilized and remains unchanged, whether the stationary disc 11 and the movable disc 12 relatively rotate in one direction or the other. More specifically, when the movable disc 12 (the unlock plate 19) rotates clockwise as shown in FIG. 19A, the small-width hole portion 19c2 of the long hole 19c is disengaged from the outside surface 15g2 of the cam pin 15g, and the left large-width hole portion 19c1 moves along the reference end surface 15g1 and then overlaps with the cam pin 15g. On the other hand, when the unlock plate 19 rotates counterclockwise as shown in FIG. 19B, the small-width hole portion 19c2 of the long hole 19c is disengaged from the outside surface 15e2 of the cam pin 15e, and the right large-width hole portion 19c3 moves along the reference end surface 15e1 and then overlaps with the cam pin 15e.

As described hitherto, the cam pins 15e, 15g individually function depending on the direction in which the stationary disc 11 and the movable disc 12 rotate relative to each other. As a result, the timing when the slide pawl 15A switches from the free zone to the lock position can be made constant whether the stationary disc 11 and the movable disc 12 relatively rotate in one direction or the other. Therefore, both the switching operation in FIG. 19A and the switching operation in FIG. 19B can be performed stably. The subsequent engagement of the slide pawls 15 with the ratchet 12c is stabilized as well.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations,
including more, less or only a single element, are also within the spirit and scope of the invention.

What is claimed is:

1. A reclining device comprising:
   a plurality of pawls having outer teeth;
   a ratchet having on an inner peripheral side thereof inner teeth that mesh with the outer teeth;
   a holder that rotates concentrically with respect to the ratchet and that holds the pawls such that the pawls can move selectively toward and away from the inner teeth of the ratchet;
   a cam body that moves the pawls toward the ratchet and brings the pawls into mesh with the ratchet to prevent the holder and the ratchet from rotating relative to each other, and that moves the pawls away from the ratchet and brings the pawls out of mesh with the ratchet to allow the holder and the ratchet to rotate relative to each other; and an unlock member that holds at least one of the pawls that has moved away from the ratchet while the holder and the ratchet form a relative rotational angle within a predetermined range and that sets a first angular range where the at least one of the pawls is out of mesh with the ratchet, and a second angular range where the-pawls adjacent to
   the at least one of the pawls move to mesh with the ratchet such that the first and second angular ranges overlap with each other in a plan view.

2. The reclining device according to claim 1, wherein the unlock member is a plate member having a notch for engagement with an engagement portion of a predetermined one of the pawls, engages the ratchet to rotate therewith, and has an edge that engages the engagement portion of the predetermined one of the pawls in a range where the predetermined one of the pawls is out of mesh with the ratchet and that prevents the predetermined one of the pawls from moving toward the ratchet.

3. The reclining device according to claim 1, wherein the unlock member is formed integrally with the ratchet.

4. A reclining device comprising:
   a plurality of pawls having outer teeth;
   a ratchet having on an inner peripheral side thereof inner teeth that mesh with the
   outer teeth;
   a holder that rotates concentrically with respect to the ratchet and that holds the pawls such that the pawls can move selectively toward and away from the inner teeth of the ratchet;
   a cam body that moves the pawls toward the ratchet and brings the pawls into mesh with the ratchet to prevent the holder and the ratchet from rotating relative to each other, and that moves the pawls away from the ratchet and brings the pawls out of mesh with the ratchet to allow the holder and the ratchet to rotate relative to each other; and an unlock member that holds at least one of the pawls that has moved away from the ratchet while the holder and the ratchet form a relative rotational angle within a predetermined range and the unlock member is provided for an amount of the pawls less than a total number of the pawls, wherein the cam body is urged to rotate for moving the pawls toward the ratchet, and when at least one of the pawls is disengaged from the ratchet by the unlock member, the pawl moves back causing the cam body to stop rotating against a urging force.

5. The reclining device according to claim 4, wherein the unlock member is mounted in such a manner as to be rotatable together with the ratchet.

6. The reclining device according to claim 5, wherein:
   a protrusion portion for engaging the unlock member is formed on at least one of the pawls, the unlock member has an arcuate hole opening along a circle concentric with the center of the holder rotating relative to the ratchet, and the arcuate hole has its inner peripheral surface engaging the engagement portion and prevents the at least one of the pawls from moving toward the ratchet.

7. The reclining device according to claim 6, wherein the arcuate hole has at least at one end thereof a recess extending radially outwardly.

8. The reclining device according to claim 6, wherein the unlock member is in the shape of a circular plate.

9. The reclining device according to claim 6, wherein the unlock member is fan-shaped.

10. The reclining device according to claim 4, wherein the pawls have an engagement portion and the unlock member has a hole to engage with the engagement portion.

11. The reclining device according to claim 4, further comprising a working plate to synchronize other pawls with the pawl.

12. The reclining device according to claim 4, wherein only one of the pawls is disengaged from the ratchet by the unlock member at a predetermined angle.

13. The reclining device according to claim 4, wherein the plurality of pawls includes more than three pawls.

14. A reclining device comprising:
a plurality of pawls having first teeth;
a ratchet having on an inner peripheral side thereof second teeth entire that mesh with the first teeth;
a holder that rotates concentrically with respect to the ratchet and that holds the pawls such that the pawls can move selectively toward and away from the second teeth of the ratchet;
a cam body that moves the pawls toward the ratchet and brings the pawls into mesh with the ratchet to prevent the holder and the ratchet from rotating relative to each other, and that moves the pawls away from the ratchet and brings the pawls out of mesh with the ratchet to allow the holder and the ratchet to rotate relative to each other; and
an unlock member that is offset from the second teeth and that holds at least one of the pawls that has moved away from the ratchet while the holder and the ratchet form a relative rotational angle within a predetermined range and that sets a first angular range where the at least one of the pawls is out of mesh with the ratchet portion of the second disk member, and a second angular range where the pawls adjacent to the at least one of the pawls move to mesh with the ratchet portion of the second disk member such that the first and second angular ranges overlap with each other in a plan view, wherein the cam body is urged to rotate for moving the pawls toward the ratchet, and when at least one of the pawls is disengaged from the ratchet by the unlock member, the pawl moves back causing the cam body to stop rotating against a urging force.

15. The reclining device according to claim 1, wherein:
an engagement portion for engaging the unlock member is formed on the at least one of the pawls and has reference end surfaces in the vicinity of widthwise marginal portions of one of the slide pawls, and
the unlock member prevents the at least one of the pawls from moving toward the ratchet by the engagement portion formed on the at least one of the pawls.

16. The reclining device according to claim 15, wherein the engagement portion of the at least one of the pawls is divided into two engagement portions with respect to a width direction of the pawl, and wherein each of the two engagement portions includes reference end surfaces.

17. The reclining device according to claim 4, wherein:
an engagement portion for engaging the unlock member is formed on the at least one of the pawls and has reference end surfaces in the vicinity of widthwise marginal portions of one of the slide pawls, and
the unlock member prevents the at least one of the pawls from moving toward the ratchet by the engagement portion formed on the at least one of the pawls.

18. The reclining device according to claim 17, wherein the engagement portion of the at least one of the pawls is divided into two engagement portions with respect to a width direction of the pawl, and wherein each of the two engagement portions includes reference end surfaces.

19. The reclining device according to claim 14, wherein:
an engagement portion for engaging the unlock member is formed on the at least one of the pawls and has reference end surfaces in the vicinity of widthwise marginal portions of one of the slide pawls, and
the unlock member prevents the at least one of the pawls from moving toward the ratchet by the engagement portion formed on the at least one of the pawls.

20. The reclining device according to claim 19, wherein the engagement portion of the at least one of the pawls is divided into two engagement portions with respect to a width direction of the pawls, and wherein each of the two engagement portions includes reference end surfaces.

* * * * *